(12) United States Patent
Chiang et al.

(10) Patent No.: US 9,065,093 B2
(45) Date of Patent: Jun. 23, 2015

(54) CONTROLLED POROSITY IN ELECTRODES

(75) Inventors: Yet-Ming Chiang, Weston, MA (US);
Chang-Jun Bae, Palo Alto, CA (US);
John William Halloran, Ann Arbor, MI (US); Qiang Fu, Albany, NY (US);
Antoni P. Tomsia, Pinole, CA (US);
Can K. Erdonmez, Miller Place, NY (US)

(73) Assignees: Massachusetts Institute of Technology, Cambridge, MA (US); The Regents of the University of California, Oakland, CA (US); The Regents of the University of Michigan, Ann Arbor, MI (US)

( * ) Notice: Subject to any disclaimer, the term of this patent is extended or adjusted under 35 U.S.C. 154(b) by 492 days.

(21) Appl. No.: 13/442,589

(22) Filed: Apr. 9, 2012

(65) Prior Publication Data

US 2012/0315538 A1     Dec. 13, 2012

Related U.S. Application Data

(60) Provisional application No. 61/473,119, filed on Apr. 7, 2011.

(51) Int. Cl.
*H01M 4/02*     (2006.01)
*H01M 4/04*     (2006.01)
(Continued)

(52) U.S. Cl.
CPC .......... *H01M 4/0411* (2013.01); *H01M 4/0471* (2013.01); *H01M 4/1391* (2013.01); *H01M 10/052* (2013.01); *H01M 2004/021* (2013.01); *Y02E 60/122* (2013.01)

(58) Field of Classification Search
None
See application file for complete search history.

(56) References Cited

U.S. PATENT DOCUMENTS 3,765,943 A   10/1973   Biagetti
3,864,167 A   2/1975   Broadbead et al.
(Continued)

FOREIGN PATENT DOCUMENTS

CA   2270771         10/2000
CN   1945881 A      4/2007
(Continued)

OTHER PUBLICATIONS

Bae et al., High density sintered electrode architecture to improve the energy density of rechargeable lithium batteries. Poster presented Jul. 1, 2010 at the 15th International Meeting on Lithium Batteries, Jun. 27-Jul. 2, 2010. Montreal, Quebec, Canada. 1 page.
(Continued)

*Primary Examiner* — Ula C Ruddock
*Assistant Examiner* — Matthew Van Oudenaren
(74) *Attorney, Agent, or Firm* — Wolf, Greenfield & Sacks, P.C.

(57) ABSTRACT

Porous electrodes in which the porosity has a low tortuosity are generally provided. In some embodiments, the porous electrodes can be designed to be filled with electrolyte and used in batteries, and can include low tortuosity in the primary direction of ion transport during charge and discharge of the battery. In some embodiments, the electrodes can have a high volume fraction of electrode active material (i.e., low porosity). The attributes outlined above can allow the electrodes to be fabricated with a higher energy density, higher capacity per unit area of electrode (mAh/cm$^2$), and greater thickness than comparable electrodes while still providing high utilization of the active material in the battery during use. Accordingly, the electrodes can be used to produce batteries with high energy densities, high power, or both compared to batteries using electrodes of conventional design with relatively highly tortuous pores.

20 Claims, 14 Drawing Sheets

(51) Int. Cl.
*H01M 4/1391* (2010.01)
*H01M 10/052* (2010.01)

(56) References Cited

U.S. PATENT DOCUMENTS

| | | | |
|---|---|---|---|
| 4,245,016 A | 1/1981 | Rampel |
| 4,555,454 A | 11/1985 | Shuster et al. |
| 4,579,637 A | 4/1986 | Jaisinghani et al. |
| 4,599,114 A | 7/1986 | Atkinson |
| 4,615,784 A | 10/1986 | Stewart et al. |
| 4,668,596 A | 5/1987 | Shacklette et al. |
| 4,758,483 A | 7/1988 | Armand et al. |
| 4,804,592 A | 2/1989 | Vanderborgh et al. |
| 4,889,777 A | 12/1989 | Akuto |
| 5,100,747 A | 3/1992 | Hayashida et al. |
| 5,187,209 A | 2/1993 | Hirai et al. |
| 5,213,895 A | 5/1993 | Hirai et al. |
| 5,227,267 A | 7/1993 | Goebel et al. |
| 5,294,504 A | 3/1994 | Otagawa et al. |
| 5,338,625 A | 8/1994 | Bates et al. |
| 5,399,447 A | 3/1995 | Chaloner-Gill et al. |
| 5,405,937 A | 4/1995 | Lemaire et al. |
| 5,436,093 A | 7/1995 | Huang et al. |
| 5,441,830 A | 8/1995 | Moulton et al. |
| 5,464,707 A | 11/1995 | Moulton et al. |
| 5,478,676 A | 12/1995 | Turi et al. |
| 5,518,833 A | 5/1996 | Repplinger et al. |
| 5,520,850 A | 5/1996 | Chaloner-Gill et al. |
| 5,527,641 A | 6/1996 | Koshiishi et al. |
| 5,554,459 A | 9/1996 | Gozdz et al. |
| 5,567,754 A | 10/1996 | Stramel |
| 5,578,396 A | 11/1996 | Fauteux et al. |
| 5,587,253 A | 12/1996 | Gozdz et al. |
| 5,588,971 A | 12/1996 | Fauteux et al. |
| 5,589,297 A | 12/1996 | Koga et al. |
| 5,591,544 A | 1/1997 | Fauteux et al. |
| 5,624,605 A | 4/1997 | Cao et al. |
| 5,635,138 A | 6/1997 | Amatucci et al. |
| 5,654,115 A | 8/1997 | Hasebe et al. |
| 5,677,080 A | 10/1997 | Chen |
| 5,698,342 A | 12/1997 | Klein |
| 5,705,291 A | 1/1998 | Amatucci et al. |
| 5,714,053 A | 2/1998 | Howard |
| 5,733,683 A | 3/1998 | Searson et al. |
| 5,759,714 A | 6/1998 | Matsufuji et al. |
| 5,789,100 A | 8/1998 | Burroughs et al. |
| 5,821,033 A | 10/1998 | Cromack et al. |
| 5,827,615 A | 10/1998 | Touhsaent et al. |
| 5,834,136 A | 11/1998 | Gao et al. |
| 5,840,087 A | 11/1998 | Gozdz et al. |
| 5,843,292 A | 12/1998 | Spiros |
| 5,846,675 A | 12/1998 | Sazhin et al. |
| 5,888,670 A * | 3/1999 | Kawakami ............... 429/231.4 |
| 5,897,522 A | 4/1999 | Nitzan |
| 5,902,689 A | 5/1999 | Vleggaar et al. |
| 5,910,382 A | 6/1999 | Goodenough et al. |
| 5,925,283 A | 7/1999 | Taniuchi et al. |
| 5,949,213 A | 9/1999 | Lanni |
| 6,063,519 A | 5/2000 | Barker et al. |
| 6,063,525 A | 5/2000 | LaFollette |
| 6,069,221 A | 5/2000 | Chasser et al. |
| RE36,843 E | 8/2000 | Lake et al. |
| 6,096,453 A | 8/2000 | Grunwald |
| 6,096,454 A | 8/2000 | Tran et al. |
| 6,096,494 A | 8/2000 | Tang et al. |
| 6,117,593 A | 9/2000 | Stachoviak et al. |
| 6,120,940 A | 9/2000 | Poehler et al. |
| 6,136,476 A | 10/2000 | Schutts et al. |
| 6,156,453 A | 12/2000 | Shimizu et al. |
| 6,159,389 A | 12/2000 | Miura et al. |
| 6,174,623 B1 | 1/2001 | Shackle |
| 6,190,798 B1 | 2/2001 | Okada et al. |
| 6,231,779 B1 | 5/2001 | Chiang et al. |
| 6,242,124 B1 | 6/2001 | Saito et al. |
| 6,280,875 B1 | 8/2001 | Kwak et al. |
| 6,280,879 B1 | 8/2001 | Andersen et al. |
| 6,287,720 B1 | 9/2001 | Yamashita et al. |
| 6,291,097 B1 | 9/2001 | Barker et al. |
| 6,300,016 B1 | 10/2001 | Jan et al. |
| 6,306,540 B1 | 10/2001 | Hiroi et al. |
| 6,322,924 B1 | 11/2001 | Hirahara et al. |
| 6,337,156 B1 | 1/2002 | Narang et al. |
| 6,342,317 B1 | 1/2002 | Patel et al. |
| 6,358,645 B1 | 3/2002 | Furukawa et al. |
| 6,395,429 B1 | 5/2002 | Kang et al. |
| 6,403,263 B1 | 6/2002 | Roach |
| 6,410,189 B1 | 6/2002 | Yamada et al. |
| 6,413,284 B1 | 7/2002 | Chu et al. |
| 6,413,285 B1 | 7/2002 | Chu et al. |
| 6,432,585 B1 | 8/2002 | Kawakami et al. |
| 6,451,487 B1 | 9/2002 | Besner et al. |
| 6,454,977 B1 | 9/2002 | Kwok et al. |
| 6,495,283 B1 | 12/2002 | Yoon et al. |
| 6,511,780 B1 | 1/2003 | Veregin et al. |
| 6,528,033 B1 | 3/2003 | Barker et al. |
| 6,555,268 B1 | 4/2003 | Inoue et al. |
| 6,565,763 B1 | 5/2003 | Asakawa et al. |
| 6,599,662 B1 | 7/2003 | Chiang et al. |
| 6,645,675 B1 | 11/2003 | Munshi |
| 6,664,006 B1 | 12/2003 | Munshi |
| 6,730,438 B2 | 5/2004 | Nakanishi et al. |
| 6,753,111 B2 | 6/2004 | Kweon et al. |
| 6,764,525 B1 | 7/2004 | Whitacre et al. |
| 6,783,894 B2 | 8/2004 | Kajiura et al. |
| 6,787,232 B1 | 9/2004 | Chiang et al. |
| 6,797,435 B2 | 9/2004 | Kweon et al. |
| 6,800,399 B2 | 10/2004 | Matsumoto |
| 6,818,356 B1 | 11/2004 | Bates |
| 6,844,105 B1 | 1/2005 | Hanafusa et al. |
| 6,855,273 B2 | 2/2005 | Ravet et al. |
| 6,878,487 B2 | 4/2005 | Cho et al. |
| 6,982,132 B1 | 1/2006 | Goldner et al. |
| 7,026,071 B2 | 4/2006 | Mayes et al. |
| 7,033,702 B2 | 4/2006 | Dasgupta et al. |
| 7,087,348 B2 | 8/2006 | Holman et al. |
| 7,090,785 B2 | 8/2006 | Chiang et al. |
| 7,318,982 B2 | 1/2008 | Gozdz et al. |
| 7,338,734 B2 | 3/2008 | Chiang et al. |
| 7,387,851 B2 | 6/2008 | Gozdz et al. |
| 7,553,584 B2 | 6/2009 | Chiang et al. |
| 7,579,112 B2 | 8/2009 | Chiang et al. |
| 7,662,265 B2 | 2/2010 | Chiang et al. |
| 7,763,382 B2 | 7/2010 | Riley et al. |
| 7,781,098 B2 | 8/2010 | Chiang et al. |
| 7,988,746 B2 | 8/2011 | Chiang et al. |
| 8,148,009 B2 | 4/2012 | Chiang et al. |
| 8,168,326 B2 | 5/2012 | Chiang et al. |
| 8,277,975 B2 | 10/2012 | Chiang et al. |
| 2001/0005558 A1 | 6/2001 | Yoshioka et al. |
| 2001/0005562 A1 | 6/2001 | Yoshioka et al. |
| 2001/0007726 A1 | 7/2001 | Yoshioka et al. |
| 2001/0043709 A1 | 11/2001 | Panitzsch |
| 2002/0000034 A1 | 1/2002 | Jenson |
| 2002/0015278 A1 | 2/2002 | Fukuyama et al. |
| 2002/0028380 A1 | 3/2002 | Tanjo et al. |
| 2002/0036282 A1 | 3/2002 | Chiang et al. |
| 2002/0048706 A1 | 4/2002 | Mayes et al. |
| 2002/0071990 A1 | 6/2002 | Kweon et al. |
| 2002/0071991 A1 | 6/2002 | Kweon et al. |
| 2002/0074972 A1 | 6/2002 | Narang et al. |
| 2002/0192137 A1 | 12/2002 | Chaloner-Gill et al. |
| 2002/0195591 A1 | 12/2002 | Ravet et al. |
| 2003/0003352 A1 | 1/2003 | Kweon et al. |
| 2003/0008212 A1 | 1/2003 | Akashi et al. |
| 2003/0049529 A1 | 3/2003 | Cho et al. |
| 2003/0054250 A1 | 3/2003 | Kweon et al. |
| 2003/0082446 A1 * | 5/2003 | Chiang et al. ............... 429/209 |
| 2003/0099884 A1 | 5/2003 | Chiang et al. |
| 2003/0114297 A1 | 6/2003 | Shinn et al. |
| 2004/0005265 A1 | 1/2004 | Chiang et al. |
| 2004/0018429 A1 | 1/2004 | Kweon et al. |
| 2004/0018430 A1 | 1/2004 | Holman et al. |
| 2004/0018431 A1 | 1/2004 | Gozdz et al. |
| 2004/0151887 A1 | 8/2004 | Forrest et al. |

(56) References Cited

U.S. PATENT DOCUMENTS

| | | | |
|---|---|---|---|
| 2004/0185343 | A1 | 9/2004 | Wang et al. |
| 2004/0265692 | A1 | 12/2004 | Long et al. |
| 2005/0026037 | A1 | 2/2005 | Riley, Jr. et al. |
| 2005/0034993 | A1 | 2/2005 | Gozdz et al. |
| 2005/0048374 | A1 | 3/2005 | Yonezawa |
| 2005/0175529 | A1 | 8/2005 | Ceder et al. |
| 2005/0181280 | A1 | 8/2005 | Ceder et al. |
| 2005/0272214 | A1 | 12/2005 | Chiang et al. |
| 2006/0035143 | A1 | 2/2006 | Kida et al. |
| 2006/0102455 | A1 | 5/2006 | Chiang et al. |
| 2006/0234131 | A1 | 10/2006 | Takami et al. |
| 2007/0009801 | A1 | 1/2007 | Inagaki et al. |
| 2007/0275300 | A1 | 11/2007 | Salot et al. |
| 2008/0099734 | A1 | 5/2008 | Chiang et al. |
| 2008/0213662 | A1 | 9/2008 | Chiang et al. |
| 2008/0254368 | A1 | 10/2008 | Ooyama et al. |
| 2008/0311470 | A1 | 12/2008 | Gozdz et al. |
| 2009/0035664 | A1 | 2/2009 | Chiang et al. |
| 2009/0202903 | A1 | 8/2009 | Chiang et al. |
| 2009/0235520 | A1 | 9/2009 | Atsumi et al. |
| 2010/0003603 | A1 | 1/2010 | Chiang et al. |
| 2010/0092867 | A1* | 4/2010 | Lau et al. ............... 429/231.8 |
| 2010/0248028 | A1 | 9/2010 | Riley et al. |
| 2011/0005065 | A1 | 1/2011 | Chiang et al. |
| 2011/0027656 | A1 | 2/2011 | Chiang et al. |
| 2011/0045346 | A1 | 2/2011 | Chiang et al. |
| 2011/0070489 | A1 | 3/2011 | Chiang et al. |
| 2011/0097623 | A1 | 4/2011 | Chang et al. |
| 2011/0151324 | A1 | 6/2011 | Chiang et al. |
| 2011/0278170 | A1 | 11/2011 | Chiang et al. |

FOREIGN PATENT DOCUMENTS

| | | |
|---|---|---|
| EP | 0 071 119 A2 | 2/1983 |
| EP | 0967672 A1 | 12/1999 |
| EP | 1 113 511 A1 | 7/2001 |
| EP | 1 042 832 A1 | 10/2001 |
| EP | 1 184 918 | 3/2002 |
| EP | 1 231 651 | 8/2002 |
| EP | 1 231 653 | 8/2002 |
| EP | 1 860 722 A1 | 8/2002 |
| GB | 976971 | 12/1964 |
| JP | 05-398038 | 8/1978 |
| JP | 53-98038 | 8/1978 |
| JP | 55-010738 A | 1/1980 |
| JP | 59-094379 | 5/1984 |
| JP | 59 152565 A | 8/1984 |
| JP | 60-183365 A | 9/1985 |
| JP | 61-4167 A | 1/1986 |
| JP | 63-121272 A | 5/1988 |
| JP | 63-289768 | 11/1988 |
| JP | 04-58455 | 2/1992 |
| JP | 4-206366 | 7/1992 |
| JP | 05-029006 | 2/1993 |
| JP | 05-041211 A | 2/1993 |
| JP | 05-109429 | 4/1993 |
| JP | 60-104167 A | 4/1994 |
| JP | 06-236768 A | 8/1994 |
| JP | 07-101728 A | 4/1995 |
| JP | 71-01728 A | 4/1995 |
| JP | 07-153492 A | 6/1995 |
| JP | 07-262986 A | 10/1995 |
| JP | 08-138650 A | 5/1996 |
| JP | 08-321306 A | 12/1996 |
| JP | 09-022693 A | 1/1997 |
| JP | 09-147862 | 6/1997 |
| JP | 09-298057 A | 11/1997 |
| JP | 09-320569 A | 12/1997 |
| JP | 11-121006 | 4/1999 |
| JP | 11-121025 A | 4/1999 |
| JP | 11-121061 | 4/1999 |
| JP | 11-154508 | 6/1999 |
| JP | 11-162519 A | 6/1999 |
| JP | 2000-021415 A | 1/2000 |
| JP | 2000-045639 A | 2/2000 |
| JP | 2000-080406 A | 3/2000 |
| JP | 2000-106213 | 4/2000 |
| JP | 2000-173645 A | 6/2000 |
| JP | 2000-195525 A | 7/2000 |
| JP | 2000-195526 A | 7/2000 |
| JP | 2000-228213 A | 8/2000 |
| JP | 2000-248095 A | 9/2000 |
| JP | 2001-151834 | 6/2001 |
| JP | 2002-151055 A | 5/2002 |
| KR | 101991000746 | 9/1991 |
| KR | 1998-071228 | 10/1998 |
| WO | WO 97/05666 A2 | 2/1997 |
| WO | WO 98/48466 A1 | 4/1997 |
| WO | WO 97/27635 A1 | 7/1997 |
| WO | WO 97/44843 | 11/1997 |
| WO | WO 98/12761 A1 | 3/1998 |
| WO | WO 98/16960 A2 | 4/1998 |
| WO | WO 99/33129 A1 | 7/1999 |
| WO | WO 99/56331 A1 | 11/1999 |
| WO | WO 00/10736 | 3/2000 |
| WO | WO 00/41256 A1 | 7/2000 |
| WO | WO 01/77501 A2 | 10/2001 |
| WO | WO 02/43168 A2 | 5/2002 |
| WO | WO 03/012908 A2 | 2/2003 |
| WO | WO 03/056646 A1 | 7/2003 |
| WO | WO 2007/028972 A1 | 3/2007 |
| WO | WO 2008/011061 A1 | 1/2008 |
| WO | WO 2008/153749 | 12/2008 |

OTHER PUBLICATIONS

Bae et al., Influence of controlled pore topology in sintered Li-ion battery cathodes on electrochemical performance. Presented at the Materials Research Society fall meeting in Nov. 2010. 18 pages.

Chiang et al., Electrode architectures for enhancing energy density in rechargeable lithium batteries. Spring MRS Meeting Invited Talk Abstract. Abstract available prior to Apr. 7, 2010. San Francisco, California. 1 page.

Chiang, Aligned (Unit Tortuosity) Porosity: 3 approaches using a removable (fugitive) pore former. Presentation slideshow accompanying talk given at Spring MRS Meeting Invited Talk. Apr. 7, 2010. No handouts were distributed. 11 pages.

Moon et al., Production of highly aligned porous alumina ceramics by extruding prozen alumina/camphene body. Journal of European Ceramic Society. 2011; 31:1945-50.

Soon et al., Assembling unidirectionally frozen alumina/camphene bodies for aligned porous alumina ceramics with larger dimensions. Journal of European Ceramic Society. Available online Oct. 28, 2010; 31:415-9.

Aleshin, A.N. et al., "Transport Properties of Poly (3,4-Ethylenedioxythiophene)/Poly (Styrenesulfonate)," Synthetic Metals 94:173 (1998).

Allen, J.L., et al., "LI1+xFE1-xPO4: Electronically conductive Lithium Iron Phospho-olivines with Improved Electrochemical Performance," The Proceedings of the Electrochemical Society 28:198-205 (2003).

Arbizzani et al, "Li1.01Mn1.974 surface modification by pol(3,4-ethylenedioxythiophene)," J. Power Sources, 2003;119-121:695-700.

Arbizzani et al., "$Li_{1.03}Mn_{1.97}O_4$ Surface Modification by Poly (3,4-Ethylenedioxithiophene)," Poster presented at $11^{th}$ Intl. Meeting on Lithium Batteries, Jun. 23-28, 2002, Monterey, CA.

Armand, M.B. et al., "Poly-Ethers as Solid Electrolytes," Proceedings of the Intl. Conference on Fast Ion Transport in Solids, Electrodes and Electrolytes, Lake Geneva, WI, 131-136 (1979).

Bouridah, A. et al., "Poly(Dimethylsiloxane)-Poly(Ethylene Oxide) Based Polyurethane Networks Used as Electrolytes in Lithium Electrochemical Solid State Batteries," *Solid State Ionics*, 15 (1985) pp. 233-240.

Broadhead et al., Chapter 2. Electrochemical Principles and Reactions. Handbook of Batteries. 1995:2.1-2.35.

Chen et al., Reducing Carbon in LiFePO4/C Composite Electrodes to Maximize Specific Energy, Volumetric Energy, and Tap Density. J Electrochem Soc. 2002;148(9):A1184-89.

(56) References Cited

OTHER PUBLICATIONS

Chiang, Y.-M. et al., "High Capacity, Temperature-Stable Lithium Aluminum Manganese Oxide Cathodes for Rechargeable Batteries," *Electrochem Sol St Lett*, 2 (3) (1999) pp. 107-110.

Cho et al., Self-Assembling Colloidal-Scale Devices: Selecting and Using Short-Range Surface Forces Between Conductive Solids. Adv Funct Matter. 2007;17:379-89.

Choi et al., Determination of electrochemical active area of porous $Li_{1-\delta}CoO_2$ electrode using the GITT technique. Solid State Ionics. 1998;109:159-63.

Darling et al., Modeling a Porous Intercalation Electrode with Two Characteristic Particle Sizes. J Electrochem Soc. 1997;144:4201-08.

Darling et al., Modeling Side Reactions in Composite $Li_yMn_2O_4$ Electrodes. J Electrochem Soc. 1998;145:990-98.

Doyle et al., Analysis of capacity-rate data for lithium batteries using simplified models of the discharge process. J Appl Electrochem. 1997;27:846-56.

Doyle et al., Modeling of Galvanostatic Charge and Discharge of the Lithium/Polymer/Insertion Cell. J Electrochem Soc. 1993;140:1526-33.

Doyle, Design and Simulation of Lithium Rechargeable Batteris. Ph.D. Thesis. Unversity of California, Berkeley. 1995. 370 pages.

Ehrlich, Chapter 35. Lithium-Ion Batteries. Handbook of Batteries. 3rd ed. 2002:35.1.

Elliott, S.R., "Physics of Amorphous Materials," Longman Group Limited. New York. 1984.

French, R.H. et al., "Full Spectral Calculation of Non-Retarded Hamaker Constants for Ceramic Systems from Interband Transition Strengths," Solid State Ionics 75:13-83 (1995).

French, R.H. et al., "Origins and Applications of London Dispersion Forces and Hamaker Constants in Ceramics," J. Am. Ceram. Soc. 83(9):2117-46 (2000).

Fuller et al., Simulation and Optimization of the Dual Lithium Ion Insertion Cell. J Electrochem Soc. 1994;141:1-10.

Gaubicher et al., Li/β-VOPO4: A New 4 V System for Lithium Batteries. J Electrochem Soc. 1999;146(12):4375-79.

Ghosh, S. et al., "Supramolecular Self-Assembly for Enhanced Conductivity in Conjugated Polymer Blends: Ionic Crosslinking in Blends of Poly(3,4,-Ethylenedioxythiophene)-Poly(Styrenesulfonate) and Poly(vinylpyrrolidone)," Adv. Mater. 10(14):1097-9 (1998).

Gray, F.M., "Solid Polymer Electrolytes," VCH Publishers Inc. New York. (1991).

Guyomard et al., Li Metal-Free Rechargeable $LiMn_2O_4$/Carbon Cells: Their Understanding and Optimization. J Electrochem Soc. 1992;139:937-48.

Hadziioannou, et al., "Monocristaus de copolymeres trisequences styrene/isoprene/styrene presentant la structure cylindrique: I. Etude de l'orientation par diffraction des rayons X aux petits angles,"Colloid Poly Sci., 257;15-22:15-22, Reference Date: 2014.

Hart, B. W., et al., "3-D Microbatteries," Electrochemistry Communications 5:120-3 (2003).

Huang et al., Approaching Theoretical Capacity of LiFePO4 at Room Temperature at High Rates. Electrochem Solid-State Letts. 2001;4(10):A170-72.

Idota, Y. et al., "Tin-Based Amorphous Oxide: A High-Capacity Lithium-Ion-Storage Material," *Science*, vol. 276 (May 30, 1997) pp. 1395-1397.

Kuwabata, S. et al., "Charge-Discharge Properties of Composites of $LiMn_2O_4$ and Polypyrole as Positive Electrode Materials for 4 V Class of Rechargeable Li Batteries," Electrochimica Acta 44(23-26):4593-600 (1999).

Le Cras, F. et al., "Lithium intercalation in Li—Mg—Mn—O and Li—Al—Mn—O spinels," *Solid State Ionics*, 89 (1996) pp. 203-213.

Li et al., Synthesis and properties of poly(2,5,8,11,14,17,20,23-octaoxapentacosyl methacrylate)-block-poly(4-vinylpyridine). Makromol Chem. 1991;192:3043-50.

Limthongkul, P. et al., "Nanocomposite Li-Ion Battery Anodes Produced by the Partial Reduction of Mixed Oxides," *Chem Mat*, 13 (2001) pp. 2397-2402.

Linden, Editor-in-Chief, "Handbook of Batteries," Second Edition, McGraw-Hill, Inc., USA, 1995 (no month), p. 2. 19.

Long, J.W., et al., "Three-Dimensional Battery Architectures," Chem. Rev. 104(10):4463-92 (2004).

Matsumoto, O., et al., "Ionic Conductivity of Dual-Phase Polymer Electrolytes Comprise of MBR-SBR Latex Films Swollen with Lithium Slat Solutions", J. Electrochem Soc., vol. 141, No. 8, Aug. 1994, 1989-93.

Matsumoto, Osamu et al., "Vaporization of Graphite in Plasma Arc and Identification of C60 in the Deposit," J. Electrochem. Soc., vol. 139, No. 1, Jan. 1992, L8-9.

Mazouzi et al., High capacity and excellent cyclability of Nano-Silicon/CB/CMC composite anode from tailored electrode preparation. 216th Electrochemical Society Meeting. 2009: Abstract #417.

Meredith et al., II. Conduction in Heterogeneous Systems. In: Advances in Electrochemistry and Electrochemical Engineering. John Wiley & Sons. New York. 1962;2:15-47.

Milling, A. et al., "Direct Measurement of Repulsive Van Der Waals Interactions Using an Atomic Force Microscope," J. Colloid & Interface Science 180:460-5 (1996).

Minett, M.G. et al, "Polymeric Insertion Electrodes," *Solid State Ionics*, 28-30 (1988), pp. 1192-1196.

Nagaoka, K. et al, "High Ionic Conductivity in Poly(dimethyl Siloxane-co-Ethylene Oxide) Dissolving Lithium Perchlorate," J. Polymer Science. pp. 659-663, vol. 22, 1984.

Nagarajan et al., A Mathematical Model for Intercalation Electrode Behavior. I. Effect of Particle-Size Distribution on Discharge Capacity. J Electrochem Soc. 1998;145:771-79.

Neumann et al., "Negative Hamaker Coefficients," Colloid and Polymer Science 257(4):413-9 (1979).

Newman et al., Theoretical Analysis of Current Distribution in Porous Electrodes. J Electrochem Soc. 1962;109:1183-91.

Newman, Chapter 22. Porous Electrodes. In: Electrochemical Systems. $2^{nd}$ Edition. Prentice Hall. Englewood Cliffs, New Jersey. 1991:450-95.

Ohzuku, Tsutomu et al., "Synthesis and Characterization of $LiAl_{frax;1;4}Ni_{frax;3;4}O_2$ (R3m) for Lithium-Ion (Shuttlecock) Batteries," J. Electrochem. Soc., vol. 142, No. 12, Dec. 1995, pp. 4033-4039.

Ong et al., Double-Layer Capapcitance in Dual Lithium Ion Insertion Cell. J Electrochem Soc. 1999;146:4360-65.

Padhi et al., Phospho-olivines as Positive-Electrod Materials for Rechargeable Lithium Batteries. J Electrochem Soc. 1997;144(4):1188-94.

Pals et al., Thermal Modeling of the Lithium/Polymer Battery. II. Temperature Profiles in a Cell Stack. J Electrochem Soc. 1995;142:3282-88.

Pals et al., Thermal Modeling of the Lithium/Polymer Battery. I. Discharge Behavior of a Single Cell. J Electrochem Soc. 1995;142:3274-81.

Pierson, Chapter 6. Virteous Carbon. Handbook of Carbon, Graphite, Diamond and Fullerenes-Properties, Processing and Applications. 1993;122-40.

Ravet et al., Electroactivity of natural and synthetic triphylite. J Power Sci. 2001;97-98:503-07.

Ravet et al., Improved Iron Based Cathode Material. Abstract No. 127, Reference Date: 2014.

Reed et al., Introduction to the Principles of Ceramic Processing. J Wiley & Sons, New York. 1988:86-89.

Tarascon et al., Issues and challenges facing rechargeable lithium batteries. Nature. Nov. 15, 2001;414(6861):359-67.

Tukamoto et al., Electronic Conductivity of LiCoO2 and its Enhancement by Magnesium Doping. J Electrochem Soc. 1997;144(9):3164-68.

Vaccaro et al., Electrochemical Investigations of Alkai-Metal Intercalation Reactions in $TiS_2$: Chronoamperometric Determination of Mass and Charge Transport Properties of Liquid Electrolyte Systems. J Electrochem Soc. 1982;129:682-88.

Van Oss, C.J. et al., "Applications of Net Repulsive Van Der Waals Forces Between Different Particles, Macromolecules or Biological Cells in Liquids," Colloids and Surfaces 1:45-56 (1980).

(56) References Cited

OTHER PUBLICATIONS

Van Oss, C.J. et al., "Comparison Between Antigen-Antibody Binding Energies and Interfacial Free Energies," Immunological Communications 6(4):341-54 (1977).

Van Oss, C.J. et al., "Repulsive Van Der Waals Forces. I. Complete Dissociation of Antigen-Antibody Complexes by Means of Negative Van Der Waals Forces," Immunological Communications 8(1):11-29 (1979).

Van Oss, C.J. et al., "Repulsive Van Der Waals Forces. II Mechanism of Hydrophobic Chromatography," Separation Science and Technology 14(4):305-17 (1979).

Wang, C. et al., "All Solid-State Li/$Li_x$MnO2 Polymer Battery Using Ceramic Modified Polymer Electrolytes," J. Electrochemical Soc. 149(8):A967-72 (2002).

Yamada et al., Crystal Chemistry of the Olivine-Type Li(MnyFe1-y)PO4 and (MNyFe1-y)PO4 as Possible 4 V Cathode Materials for Lithium Batteries. J Electrochem Soc. 2001;148(8):A960-67.

Yamada et al., Optimized LiFePO4 for Lithium Battery Cathodes. J Electrochem Soc. 2001;148(3):A224-29.

Zallen et al., 4.7. Continuum Percolation and the Critical Volume Fraction. The Physics of Amorphous Solids. J Wiley & Sons, NY. 1983:183-91.

\* cited by examiner

_US 9,065,093 B2_

CONTROLLED POROSITY IN ELECTRODES

RELATED APPLICATIONS

This application claims priority under 35 U.S.C. §119(e) to U.S. Provisional Patent Application Ser. No. 61/473,119, filed Apr. 7, 2011, and entitled "Controlled Porosity in Electrodes," which is incorporated herein by reference in its entirety for all purposes.

GOVERNMENT SPONSORSHIP

This invention was made with government support under Grant No. FA8650-09-D-5037 awarded by the Air Force Research Laboratory and under Grant No. DE-AC02-05CH11231 awarded by the Department of Energy. The government has certain rights in this invention.

TECHNICAL FIELD

Electrodes comprising pores having low tortuosity, and associated systems and methods, are generally provided.

BACKGROUND

The design and manufacturing process for many rechargeable batteries, including lithium rechargeable batteries, often involves fabricating thin laminates of powder-based electrodes, which are highly compressed by calendering, and which are subsequently infused with inorganic liquid electrolytes. Porous electrode theory has been developed to understand and model transport in such electrodes. The electrode designs employed to produce many current batteries is in many ways a poor compromise, forced by practical manufacturing considerations. Because the lowest-cost forms of metal oxide or carbon-based electrode-active materials are powders, electrode fabrication processes have been developed to accommodate starting materials of powder form. For cylindrical or prismatic cells, the electrode generally must simultaneously attempt to meet all of the following properties: 1) a windable or stackable form, strongly adhered to thin aluminum or copper current collector foils; 2) adequate electronic conduction; 3) adequate ionic conduction; and 4) high volume packing energy density. In order to achieve a high volumetric packing of active material, pressure-consolidation is practiced. However, such electrodes also have a substantial amount of electrochemically-inactive material such as polymer binders and carbon conductive additives. These are soft materials of low density, and are deformed during the pressure-consolidation process into the space between the harder particles of lithium storage materials, which can lead to the formation of tortuous pores. The use of such electrodes can be disadvantageous for a variety of reasons. Accordingly, improved electrodes and methods for making the same would be desirable.

SUMMARY

Porous electrodes in which the porosity has a low tortuosity, and associated systems and methods, are generally provided. The subject matter of the present invention involves, in some cases, interrelated products, alternative solutions to a particular problem, and/or a plurality of different uses of one or more systems and/or articles.

In one aspect, a method of forming an electrode is provided. In certain embodiments, the method comprises producing an electrode structure comprising a first constituent, and a second constituent associated with the first constituent, the second constituent including a plurality of substantially aligned elongated regions, each elongated region having an aspect ratio of at least about 3:1. In some embodiments, the method comprises removing at least a portion of the second constituent from the structure to form elongated pores associated with the structure; and separating a first portion of the structure from a second portion of the structure.

In another aspect, electrodes are described. In some embodiments, the electrode comprises a matrix material comprising high-tortuosity pores, and a plurality of low-tortuosity pores extending through the matrix material and from a first external geometric surface of the electrode to a second external geometric surface of the electrode. In some embodiments, the tortuosities of the pores within the matrix material are at least about 0.5 greater than the tortuosities of the low-tortuosity pores, the electrode has a total porosity of from about 20% to about 60%, and the percentage of the total porosity that is occupied by the low-tortuosity pores is from about 20% to about 80%.

In certain embodiments, the electrode comprises a matrix material comprising an electrode active material, and a plurality of low-tortuosity pores extending from a first external geometric surface of the electrode to a second external geometric surface of the electrode. In some embodiments, the ratio of the average cross-sectional diameter of the low-tortuosity pores to the mean pore spacing of the low-tortuosity pores is from about 0.05 to about 1.0.

In some embodiments, the electrode comprises a matrix material comprising an electrode active material, and a plurality of low-tortuosity pores extending from a first external geometric surface of the electrode to a second external geometric surface of the electrode. In certain embodiments, the ratio of the thickness of the electrode to the mean pore spacing of the low-tortuosity pores within the electrode is from about 0.1 to about 30.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
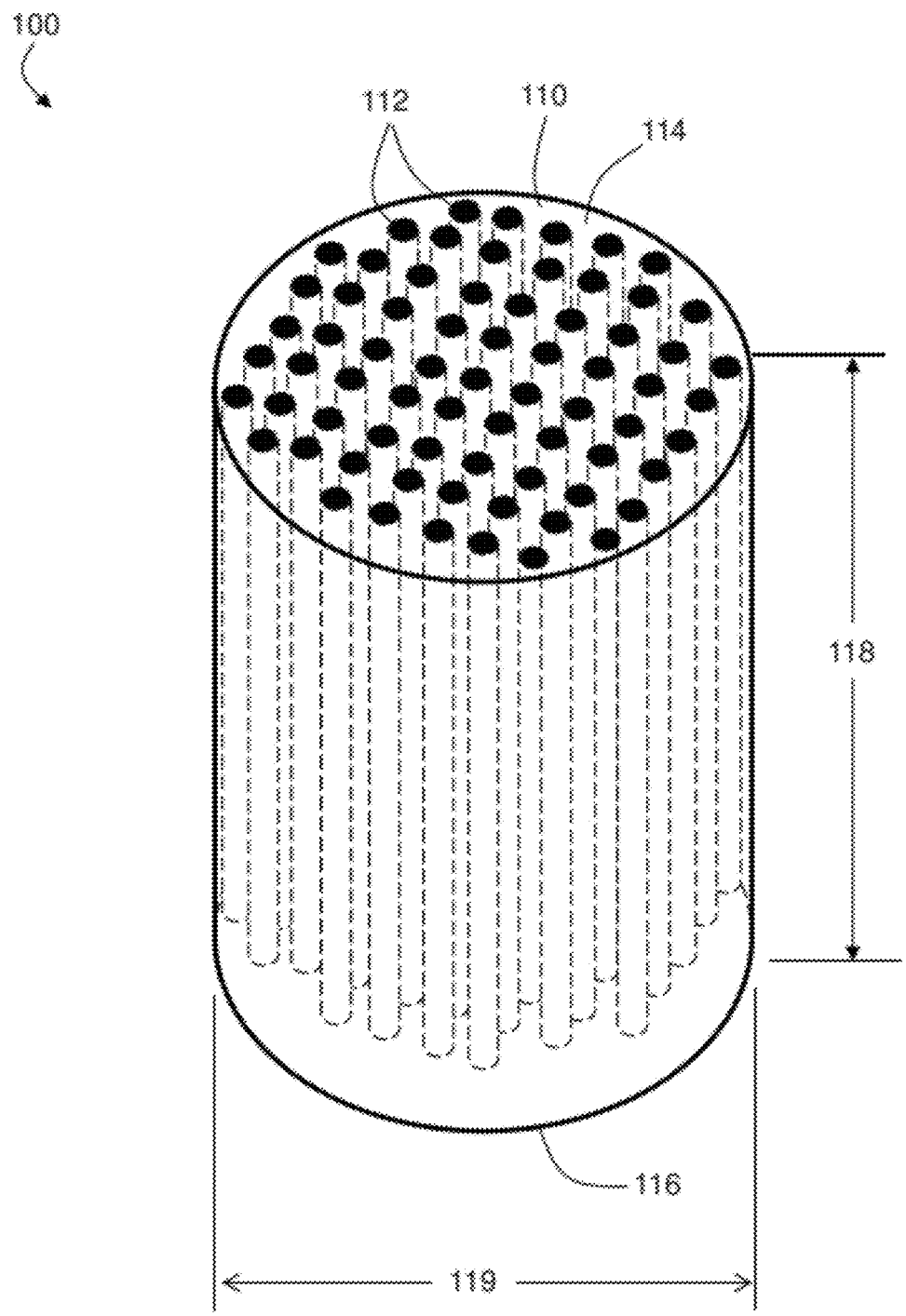
FIGS. 1A-1B are schematic diagrams illustrating a primary structure comprising a plurality of aligned elongated regions and a method for making electrodes from the primary structure, according to one set of embodiments.

Porous electrodes in which at least a portion of the porosity has a low tortuosity are generally provided. In some embodiments, the porous electrodes can be designed to be filled with electrolyte and used in batteries, and can include low tortuosity in the primary direction of ion transport during charge and discharge of the battery. In some embodiments, the electrodes can have a high volume fraction of electrode active material (i.e., low porosity). The attributes outlined above can allow the electrodes to be fabricated with a higher energy density, higher capacity per unit area of electrode ($mAh/cm^2$), and greater thickness than comparable electrodes while still providing high utilization of the active material in the battery during use. Accordingly, the electrodes can be used to produce batteries with high energy densities, high power, or both compared to batteries using electrodes of conventional design with relatively highly tortuous pores.

The electrodes and methods described herein can be used in and applied to many battery types, including primary (disposable) and rechargeable (secondary) batteries, and many battery "chemistries" including nonaqueous or aqueous battery chemistries using lithium ions, sodium ions, magnesium ions, aluminum ions, protons, or hydroxyl ions as the working ions, examples of which include lithium primary batteries, lithium-ion batteries, alkaline batteries, nickel metal hydride batteries, nickel-cadmium batteries, and the like. While lithium batteries are generally described to illustrate the invention, it should be understood that any of the chemistries outlined above (and others) could be substituted for the lithium chemistries described herein.

As noted above, the manufacture of electrodes via many prior art techniques produces electrodes with irregularly-shaped pores. For example, in many cases, the pore space, which is generally filled with electrolyte, has a high tortuosity (i.e., the effective path length over projected path length) that is typically 3 or greater. High tortuosity can hinder the rate of ion transport through the porous network. For example, the rate of ion transport through the pore network in an electrode with a tortuosity of 3 is ⅓ of the rate of ion transport through the pore network of an electrode with the same percentage porosity but in which the pores have a tortuosity of 1 (corresponding to a straight pore channel of constant cross-section). Thus, in order to achieve the same rate capability through said electrode in the regime where ion transport through the pore channels is limiting, an electrode with a tortuosity of 3 must have one-third the thickness of an electrode with a tortuosity of 1 in order to have the same power, all other factors being equal. The use of thinner electrodes and/or electrodes with greater porosity to compensate for the effects of high tortuosity can cause the energy density of the battery to be decreased (when compared at the same power). Thus, having low tortuosity electrodes while also maintaining a high volume fraction of electrode active material is advantageous.

U.S. Patent Application Publication No. 2009/0035664 A1 to Chiang, et al. and U.S. Patent Application Publication No. 2009/0202903 to Chiang, et al., each of which is incorporated herein by reference in its entirety for all purposes, discloses high density, high thickness, reduced tortuosity electrodes that are sintered from powders of electrode active materials, and resulting batteries of much higher energy density than conventional lithium-ion batteries. U.S. Pat. No. 7,553,584 to Chiang et al., discloses perforated electrodes with a tortuosity of 1. The embodiments described herein provide for electrodes of high density and low tortuosity, and methods of manufacture for such electrodes.

In some embodiments, electrodes with relatively low tortuosities can be obtained by producing a relatively large porous structure (e.g., an elongated porous structure) and separating the electrodes (e.g., via slicing) from the structure. By first producing a large-scale structure (relative to the scale of the final porous structures used as the electrodes), one can more effectively control the shape, size, and orientation of the pores of the electrodes.

In one set of embodiments, a structure (e.g., an elongated structure) is provided that includes a first constituent and a second constituent associated with the first constituent. The first and second constituents generally have different compositions, which can allow one to remove one constituent from the porous structure without substantially removing the other constituent. In this way, the constituent that is eventually removed from the porous structure can be used as a template that defines pores left behind within the porous structure after that constituent is removed. The constituent that is removed to form the pores within the porous structure can be referred to as the "fugitive constituent," while the constituent that remains after the fugitive constituent is removed can be referred to as the "matrix constituent."

A variety of materials are suitable for use in the fugitive constituent. In some embodiments, the fugitive constituent can comprise a carbon-based material (e.g., carbon black, graphite-based materials (e.g., graphitic carbon), organic polymers, hydrocarbons (e.g., naphthalene, waxes, alcohol (e.g., ethylene glycol) etc.), n-methylpyrrolidone (NMP), terpenes (e.g., camphene), and the like), and/or water (e.g., ice), among others.

In addition, a variety of materials are suitable for use in the matrix constituent. For example, the matrix constituent can comprise one or more ceramics. In some embodiments, the matrix constituent can comprise an electrode active material, such as $Li_xCo_yO_z$ (e.g., $LiCoO_2$ particles) and/or any of a variety of electrode active materials described in more detail below.

FIG. 1A is an exemplary schematic illustration of an exemplary primary structure 100 comprising a plurality of elongated regions, according to one set of embodiments. In FIG. 1A, primary structure 100 includes a first constituent 110 (e.g., a "matrix constituent") and a second constituent 112 (e.g., a "fugitive constituent").

As illustrated in FIG. 1A, primary structure 100 is elongated, such that the ratio of the length 118 of structure 100 is about two times the diameter 119 of structure 100 (producing an aspect ratio of about 2:1). In certain embodiments, the primary structure can be elongated such that it has an aspect ratio of at least about 3:1, at least about, at least about 5:1, at least about 10:1, at least about 50:1, at least about 100:1, at least about 1000:1, or greater. In some embodiments, the primary structure can have an aspect ratio between about 3:1 and about 10,000:1, between about 5:1 and about 10,000:1, between about 10:1 and about 10,000:1, between about 50:1 and about 10,000:1, between about 100:1 and about 10,000:1, or between about 1000:1 and about 10,000:1. The invention is not limited to the use of elongated structures, however, and in other embodiments, the primary structure is not elongated.

The fugitive constituent can be associated with the matrix constituent such that, when the fugitive constituent is removed, a plurality of elongated pores are left behind within the matrix constituent. In some embodiments, the fugitive constituent is distributed within the outer boundaries of the matrix constituent such that the fugitive constituent forms pores that are at least partially surrounded (and in some cases, completely surrounded except at their ends) along their longitudinal axes by the matrix constituent. For example, in FIG. 1A, the regions of fugitive constituent 112 are completely surrounded by matrix constituent 110, except at the ends of the fugitive constituent regions. In certain embodiments, the elongated regions of fugitive constituent 112 extend substantially across structure 100, as illustrated in FIG. 1A. In some embodiments, the fugitive constituent (and, as a result, the pores formed within the final structure) are substantially evenly distributed within the outer boundaries of the matrix constituent.

In some embodiments, the fugitive constituent can include a plurality of elongated regions. For example, in the set of embodiments illustrated in FIG. 1A, fugitive constituent 112 includes a plurality of elongated regions that extend along the longitudinal axis of the elongated structure. The elongated regions can have relatively large aspect ratios such as, for example, at least about 3:1, at least about 5:1, at least about 10:1, at least about 50:1, at least about 100:1, at least about 1000:1, or greater. In some embodiments, the elongated regions can have aspect ratios between about 3:1 and about 10,000:1, between about 5:1 and about 10,000:1, between about 10:1 and about 10,000:1, between about 50:1 and about 10,000:1, between about 100:1 and about 10,000:1, or between about 1000:1 and about 10,000:1. As used herein, the aspect ratio of an elongated article is measured as the ratio between the length of the article along its longitudinal axis and the maximum cross sectional dimension of the article, as measured substantially perpendicularly to its longitudinal axis.

In some embodiments, the plurality of elongated regions of the second constituent (e.g., the fugitive constituent) can extend from one boundary of the primary structure to another boundary (e.g., an opposed boundary) of the primary structure. For example, in the set of embodiments illustrated in FIG. 1A, the elongated portions of constituent 112 extend from boundary 114 of primary structure 100 to boundary 116 of primary structure 100, which is opposed to boundary 114. In other embodiments, the elongated regions might only extend partially through the large-scale structure. In certain embodiments, elongated regions of constituent 112 extend at least about 50%, at least about 75%, or at least about 90% of the distance between the ends of the primary structure.

In the set of embodiments illustrated in FIG. 1A, the elongated regions of constituent 112 are substantially circular in cross-sectional shape. However, the plurality of elongated regions of the fugitive constituent and/or the pores formed from the elongated regions can have any suitable cross-sectional shape including, but not limited to, a substantially elliptical cross-sectional shape (including a substantially circular cross-sectional shape), a cross-section substantially in the shape of a parallelogram (including a substantially rectangular and/or a substantially square cross-sectional shape), a substantially triangular cross-sectional shape, or an irregular cross-sectional shape, among others. In certain embodiments, the elongated regions of constituent 112 can have a substantially constant cross-sectional shape along essentially the entire length of the elongated regions of constituent 112.

At least a portion of the fugitive constituent can be removed from the primary structure to form elongated pores associated with the primary structure, in some embodiments. For example, in FIG. 1A, fugitive constituent 112 can be at least partially removed from structure 100 to leave behind elongated pores within matrix constituent 110. In some embodiments, at least about 50%, at least about 75%, at least about 90%, at least about 95%, or substantially all of a constituent (e.g., the fugitive constituent) is removed from the primary structure.

Removal of at least a portion of a constituent can be achieved using a variety of methods. For example, in some embodiments, at least a portion of the fugitive constituent can be removed by heating the fugitive constituent. Heating the fugitive constituent can lead to combustion, pyrolysis, sublimation, evaporation, and/or melting of the fugitive constituent, after which, the fugitive constituent can leave behind elongated pores within the matrix constituent. As a specific example, in some embodiments, the fugitive constituent can comprise carbon black, which can be removed via pyrolysis. In some embodiments, removing the fugitive constituent can comprise at least partially sublimating the fugitive constituent. As specific examples, the fugitive constituent can comprise ice, n-methylpyrrolidone (NMP), naphthalene, or camphene, any one of which can be removed via freeze drying (also referred to as lyophilization).

In some embodiments, the plurality of elongated regions of the fugitive constituent and/or the pores formed within the matrix constituent after at least a portion of the fugitive constituent is removed can be substantially aligned with each other and/or substantially aligned with the longitudinal axis of the primary structure. For example, in the set of embodiments illustrated in FIG. 1A each of the elongated regions of fugitive constituent 112 are substantially aligned with each other. In addition, in FIG. 1A, each of the elongated regions of fugitive constituent 112 are substantially aligned with the longitudinal axis of primary structure 100. Of course, the invention is not limited to embodiments in which the longitudinal axes of the regions of the fugitive constituent are substantially aligned with each other and/or the longitudinal axis of the primary structure. For example, in certain embodiments, the longitudinal axes of the regions of the fugitive constituent are not substantially aligned with each other. In some embodiments, the longitudinal axes of the regions of the fugitive constituent are not aligned with the longitudinal axis of the primary structure (and, in such embodiments, the longitudinal exes of the regions of fugitive constituent may or may not be aligned with each other).

Figure 1B:
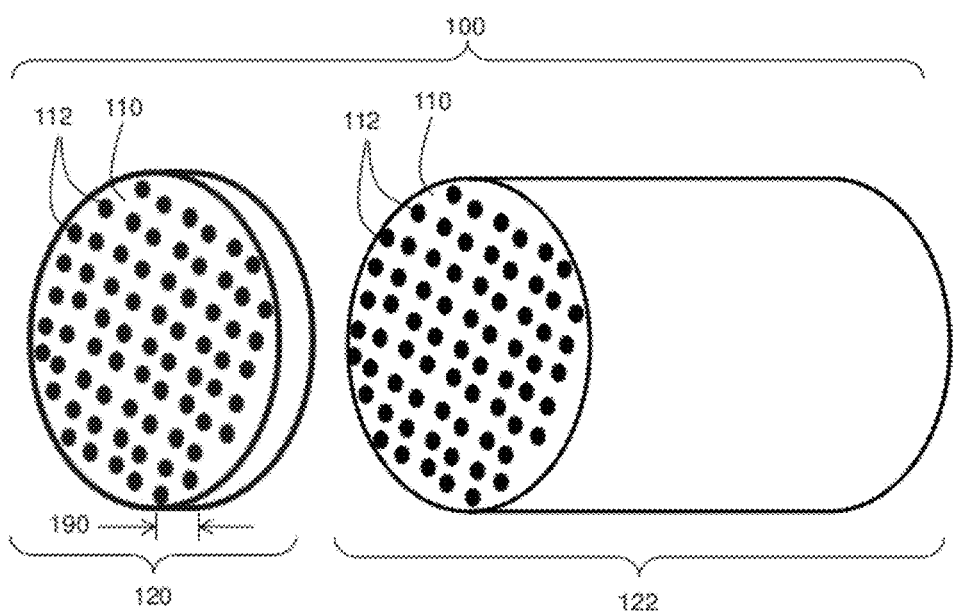

In some embodiments, a first portion of the primary structure can be separated from a second portion of the primary structure, for example, when forming a porous electrode. Separation of the first and second portions of the primary structure can occur prior to and/or after removing the fugitive constituent. In some embodiments, a first portion of the primary structure can be separated from a second portion of the primary structure by cutting the two portions apart (e.g., using a diamond slicing wheel, saw, or any other suitable implement). For example, in the set of embodiments illustrated in FIG. 1B, primary structure 100 has been cut to form first portion 120 and second portion 122. For purposes of clarity, the hidden lines (indicated by dashed lines) present in FIG. 1A have been omitted from FIG. 1B.

In some embodiments, the first and second portions of the primary structure are separated along a plane that is substantially perpendicular to the longitudinal axis of the primary structure from which they are formed. In some embodiments, the first and second portions of the primary structure are separated along a plane that is substantially perpendicular to the longitudinal axes of the elongated regions of the fugitive constituent and/or the longitudinal axes of the pores left behind after at least a portion of the fugitive constituent is removed. For example, in FIG. 1B, first portion 120 and second portion 122 have been formed by cutting primary structure 100 along a plane that is substantially perpendicular to the longitudinal axis of primary structure 100 as well as the longitudinal axes of regions of constituent 112. In some embodiments, the separation of the primary structure to form two or more portions (e.g., portions 120 and 122) can occur before removal of a constituent of the primary structure (e.g., constituent 112). The separation of the primary structure to form two or more portions (e.g., portions 120 and 122) can occur, in certain embodiments, after removal of a constituent of the primary structure (e.g., constituent 112).

In some embodiments, multiple portions of the primary structure are produced via multiple cutting steps (e.g., at least 3, at least 5, at least 10, at least 100, or more). For example, multiple slices can be taken from the primary structure prior to and/or after removal of the fugitive constituent (and/or prior to and/or after a sintering step). By cutting the primary structure multiple times, multiple porous electrode structures can be formed.

In some embodiments, at least a portion of the primary structure can be sintered, for example, to add mechanical strength to the final product (e.g., an electrode) formed from the primary structure. The sintering step can be performed after and/or while the fugitive constituent is removed to form the primary structure. In some embodiments, at least a portion (and/or all) of the primary structure can be sintered prior to the separation of a first portion of the primary structure from a second portion of the primary structure. In some embodiments, at least a portion (and/or all) of a separated portion of the primary structure can be sintered.

The primary structure (e.g., structure 100 as illustrated in FIG. 1A) can be produced using a variety of methods.

In certain embodiments, a primary structure such as structure 100 can be formed by arranging a first constituent such that it at least partially surrounds one or more portions of a second constituent. In some embodiments, the first constituent can substantially completely surround the longitudinal axis of the second constituent, optionally leaving the second constituent exposed at its end. For example, in the set of embodiments illustrated in FIG. 2A, structure 200 is formed by positioning first constituent 210 such that it substantially completely surrounds the longitudinal axis of second constituent 212. In the set embodiments illustrated in FIG. 2A the ends a second constituent 212 are left exposed. However, in other embodiments, the ends of second constituent 212 could be partially enclosed, while leaving enough room for eventual evacuation of constituent 212 from constituent 210).

Figure 2A:
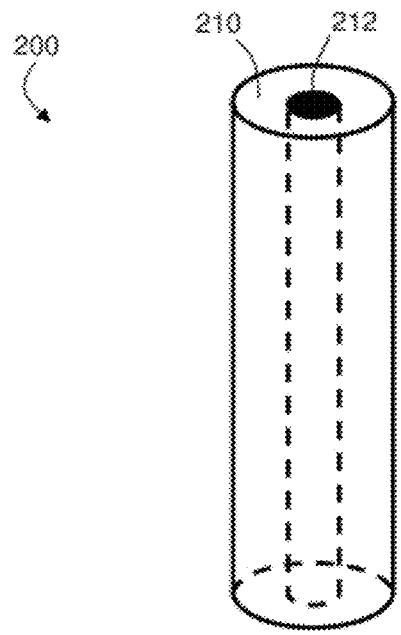
FIGS. 2A-2D are, according to certain embodiments, schematic diagrams illustrating the formation of structures comprising a first constituent at least partially surrounding one or more regions of a second constituent, and extrusion arrangements for processing such structures.

While a single region of second constituent 212 is illustrated in FIG. 2A, in other embodiments, multiple regions of second constituent 212 can be positioned such that they are at least partially surrounded by first constituent 210. In certain embodiments, this can be achieved by manually positioning the first and second constituents such that the first constituent at least partially surrounds one or more portions (e.g., all portions) of a second constituent. For example, in certain embodiments, the first constituent can be formed into a desired shape (e.g., a substantial cylinder) and one or more voids can be formed in the first constituent (e.g., using a drill or any other suitable tool). The void(s) can then be filled with the second constituent. In other cases, other methods for forming the first and second constituents may be used.

In certain embodiments, the lateral dimensions of the structure comprising the first and second constituents can be shortened, for example, by applying a force to the structure (and, accordingly, to the first and second constituents). For example, a force with a component normal to the longitudinal axis of the first and/or second constituents can be applied to reduce the lateral dimensions of the first and/or second constituents. Generally, the lateral dimensions of the first and second constituents (and other elongated structures described herein) are substantially perpendicular to the longitudinal axes of the first and second constituents.

Application of a force with a component normal to the longitudinal axes of the first and/or second constituents can be achieved using any suitable method. For example, the structure comprising the first and second constituents can be pressed between two surfaces, compressed within a contracting volume, or otherwise exposed to an applied compressive force.

In certain embodiments, a force can be applied by subjecting the structure to an extrusion process (e.g., a co-extrusion process in which at least a first constituent and a second constituent are processed). For example, a structure comprising first and second constituents can be compressed by transporting the structure or a precursor thereof in a direction substantially parallel to its longitudinal axis through an opening with a cross-sectional dimension (e.g., a cross-sectional diameter) that decreases along the longitudinal axis of the opening. The opening can correspond to, for example, the opening of an extrusion die. The use of an extrusion process can be advantageous, in certain cases, because many extrusion processes can be run substantially continuously. This can allow for relatively high throughput, continuous production of compressed structures.

Figure 2B:
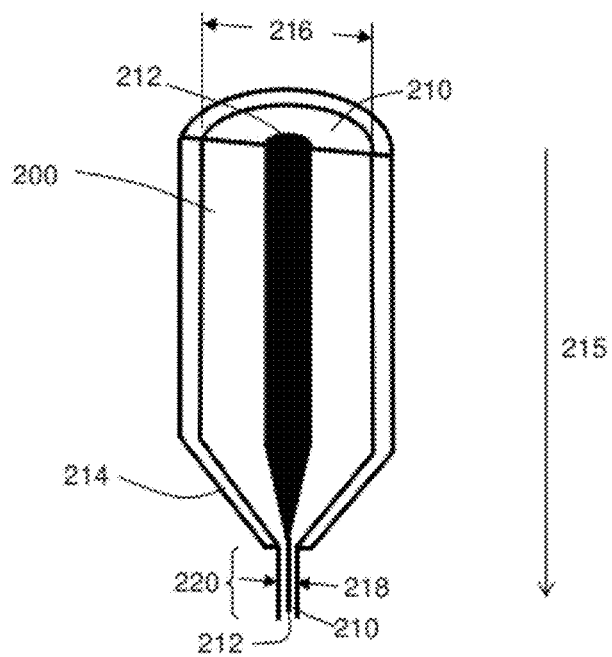

FIG. 2B is a perspective view of a cross-section of an exemplary extrusion process. In FIG. 2B, structure 200 is transported through extrusion die 214 in the direction of arrow 215 to form extrudate structure 220. When structure 200 is transported through a die 214, the lateral dimension of structure 200 is reduced from a first value (e.g., corresponding to dimension 216 in FIG. 2B) to a second, smaller value (e.g., corresponding to dimension 218 of extrudate structure 220 in FIG. 2B). In addition, the lateral dimensions of the constituents within structure 200 (e.g., constituent 210 and constituent 212) can be reduced in size.

In some embodiments, the maximum lateral dimensions of the structure comprising the first and second constituent (and/or the maximum lateral dimensions of the constituents within the structure) can be reduced by at least about 50%, at least about 75%, at least about 90%, or at least 95%, measured relative to the original value of the maximum lateral dimension. In certain embodiments, the structure can have a maximum lateral dimension (as measured perpendicular to the length of the structure) of at least about 1 centimeter, at least about 5 centimeters, or at least about 10 centimeters (and/or up to about 100 centimeters) prior to being subjected to the process used to reduce its lateral dimension. In some embodiments, the structure can have a maximum lateral dimension equal to or less than 10 centimeters or equal to or less than 1 centimeter (and/or down to about 1 millimeter) after being subjected to the process used to reduce its lateral dimension.

In certain embodiments, a primary structure comprising multiple regions of a fugitive constituent material can be produced by sequentially performing processes that reduce the lateral dimensions of structures comprising first and second constituents (e.g., fugitive constituent(s) and matrix constituent(s)). For example, in some embodiments, a plurality of first structures (e.g., structure 200 in FIG. 2A) comprising a first constituent(s) at least partially surrounding second constituents can be processed (e.g., via extrusion or any other suitable size reduction process) such that the lateral dimensions of the structures (and the lateral dimensions of any constituents within the structures) are reduced in size to produce first extrudate structures. The first extrudate structures can then be bundled together, and the bundle can be subsequently processed (e.g., via extrusion or any other suitable size reduction process) to further reduce the lateral dimensions of the bundle and/or any constituents within the bundle. The lateral size reduction process can be repeated once, twice, three times, four times, or more.

In some embodiments, a primary structure or a precursor thereof can be produced by co-extruding at least a first constituent and a second constituent. In some such embodiments, multiple extrusion steps can be performed (optionally, after bundling two or more lateral-size-reduced extrudate structures) to enhance the degree to which the lateral dimensions of one or more constituents within the structure are reduced. This can result in the production of a primary structure with first and second constituent phases that have much smaller lateral dimensions than could otherwise be produced.

Figure 2C:
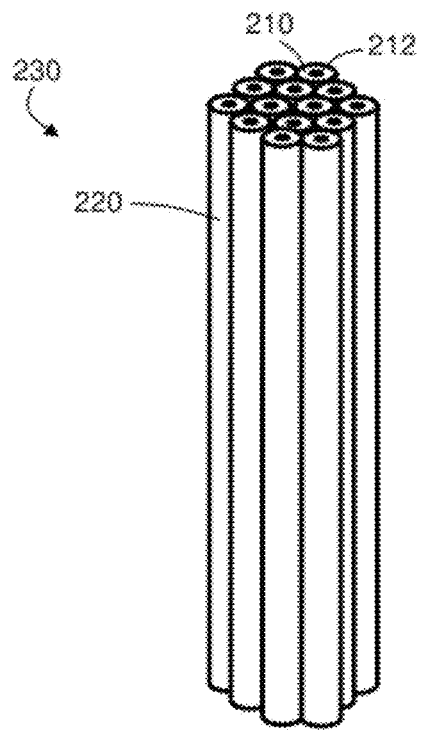
Figure 2D:
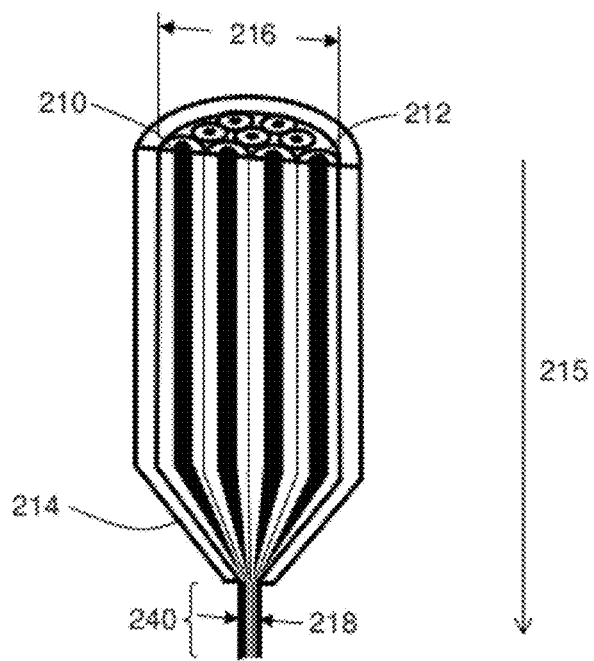

FIGS. 2C-2D are schematic diagrams illustrating one method by which a primary structure (such as the one illustrated in FIG. 1A) can be formed using a plurality of extrudate structures (such as extrudate structure 220 formed in FIG. 2B). For purposes of clarity, hidden lines (shown as dotted lines in FIG. 2A) have been omitted from FIGS. 2C-2D. In FIG. 2C, multiple extrudate structures 220 have been arranged to form bundle 230. Extrudate structures 220 can be arranged in a side-by-side manner. In addition, extrudate structures 220 can be arranged such that their longitudinal axes are substantially aligned. As illustrated in FIG. 2D, bundle 230 can be transported through extrusion die 214 in the direction of arrow 215 to form composite extrudate structure 240. In FIG. 2D, the lateral dimension of the bundle has been reduced from dimension 216 to dimension 218. In certain embodiments, a plurality of composite extrudate structures 240 can be arranged in a bundle and subsequently transported through extrusion die 214 to produce a composite of composite extrudate structure in which the lateral dimensions of the constituents are even smaller than those within composite extrudate structure 240. As noted above, the bundling and extrusion processes can be repeated once, twice, three times, four times, or more.

In one set of embodiments, aligned-porosity electrodes can be made by a co-extrusion process in which at least one extruded formulation (e.g., constituent 212) contains the electrode active material, and at least a second extruded formulation (e.g., constituents 210) is one that can be later removed in order to form an introduced pore. In one specific embodiment, the pore-forming phase contains carbon or other materials that are removed by pyrolysis, combustion, or any of the other processes mentioned herein.

Any suitable type of extrusion process can be used to perform the extrusion steps described herein. For example, the co-extrusion process can be of the "controlled feedrod" type, for example using piston extrusion, or other extrusion type including conventional continuous co-extrusion.

In some embodiments, the primary structure (e.g., structure 100 illustrated in FIG. 1A) can be produced by cooling a precursor of the primary structure to produce the first constituent and the second constituent. In some embodiments, the precursor of the primary structure can include a fluid in which solid particles are suspended. Upon cooling the precursor, the particles can agglomerate to form the first constituent, and the fluid can solidify (e.g., freeze) to form the second constituent.

Figure 3A:
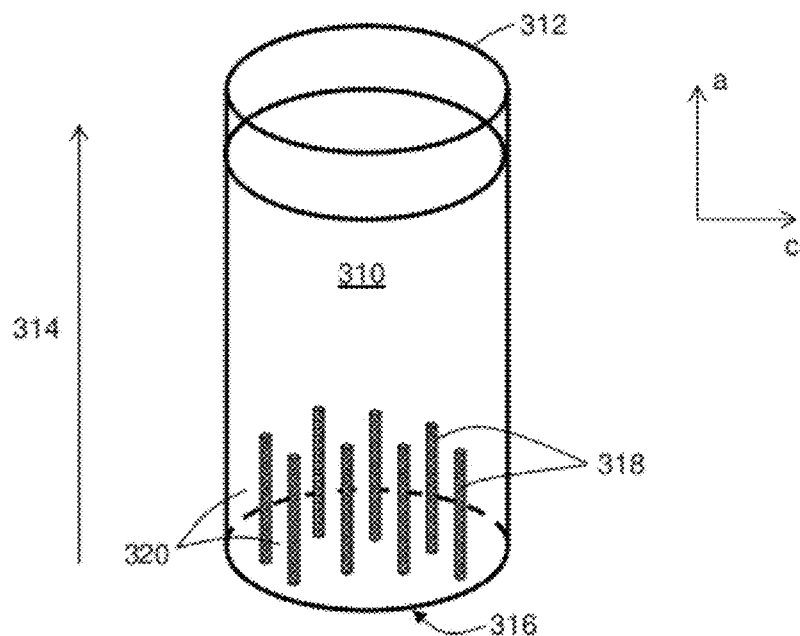
FIGS. 3A-3B are, according to certain embodiments, schematic diagrams illustrating the formation of a primary structure via directional solidification, according to one set of embodiments.
Figure 3B:
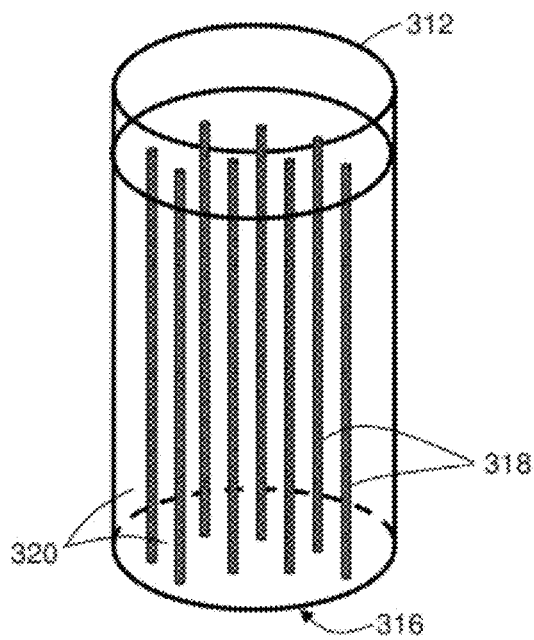

FIGS. 3A-3B are schematic illustrations outlining a method of forming a primary structure using directional solidification. In FIG. 3A, fluid 310 is contained within vessel 312. Particles of solid material can be suspended in fluid 310. In certain embodiments, a thermal gradient can be established across the fluid. For example, in FIG. 3A, a thermal gradient can be established in the direction of arrow 314, such that the arrow points in the direction of increasing temperature. The thermal gradient can be established by cooling one end of the fluid. For example, end 316 of vessel 312 can be cooled by applying a cooled solid or fluid (e.g., liquid nitrogen, ice, etc.), or by any other method known to those of ordinary skill in the art.

In certain embodiments, as the thermal gradient is established across the fluid, the fluid can solidify (e.g., crystallize). For example, in FIG. 3A, solid portions 318 can grow in the direction of arrow 314 as the thermal gradient is established across fluid 310. In certain embodiments, as the fluid solidifies, the particles can be transported away from the solidifying fluid. For example, in FIG. 3A, the solid particles can be transported away from solidified portions 318 toward regions 320. In certain embodiments, fluid portions can be solidified from end to end as illustrated, for example, in FIG. 3B.

The particles suspended in the fluid can comprise a variety of types of materials. The solid particles can contain, for example, electrode active material (including any of the electrode active materials described herein), which can be useful in forming porous electrodes from the primary structure, as described above and elsewhere herein.

The fluid in which the particles are suspended can also comprise any suitable material. In some embodiments, the fluid is an aqueous fluid and can be solidified to form ice. In other embodiments, the fluid is non-aqueous. For example, in some embodiments, the fluid in which the particles are suspended comprises a hydrocarbon (e.g., an alcohol, ether, ketone, etc.). In some embodiments, the fluid in which the particles are suspended comprises an alcohol (e.g., ethylene glycol), an aromatic compound (e.g., benzene, naphtalene), n-methylpyrrolidone (NMP), a terpene (e.g., camphene), or any other suitable material. In certain embodiments, the fluid in which the particles are suspended comprises naphthalene.

In one set of embodiments in which cooling or a precursor is used to produce the primary structure, high energy density, low tortuosity electrodes are manufactured by a directional freeze-casting process. In this set of embodiments, a suspension (e.g., slurry) of solid particles (e.g., ceramic particles) can be formed in a liquid, which may be aqueous or non-aqueous. In some embodiments, the suspension can be cooled at a controlled freezing rate in a designated direction. The cooling can be controlled in such a way that unidirectional crystals of the solvent phase are generated during the solidification process.

One specific embodiment uses water as a solvent for the ceramic slurry preparation. In some such embodiments, the microstructure of the specimens is a replica of ice formed during directional solidification. The temperature gradient resulting from the cooling of the slurry from the bottom to the top can cause a crystalline structure to grow in the same direction as the temperature gradient. Meanwhile, ceramic particles can be rejected by the growing ice front and entrapped between ice crystals, resulting in a continuous ceramic structure. Subsequently, the crystallized solvent phase (ice or a non-aqueous solvent, including for example n-methylpyrrolidone (NMP), naphthalene, and/or a terpene (e.g., camphene)) can be freeze-dried (lyophilized) to remove the crystals by sublimation and leave a porous green sample. The porous green sample can then be strengthened by a sintering step. The microstructure can be influenced by the ceramic content in the slurry, freezing rate, and additives. The aqueous phase can be relatively easy to remove (e.g., by freeze drying) and can enable the production of porous ceramic structures such as $LiCoO_2$ electrodes that can be used for improved lithium-ion battery performance.

In certain embodiments, the primary structure (e.g., structure 100 illustrated in FIG. 1A) can be produced using a combination of the methods described herein. For example, in certain embodiments, the primary structure can be produced by cooling a precursor of the primary structure to produce a first constituent and a second constituent (e.g., via freeze casting) and subsequently applying a force to reduce the lateral dimensions of the cooled structure (e.g., via co-extrusion). As one particular example, particles (e.g., comprising electrode active material) can be suspended in a terpene (e.g., camphene), naphthalene, or any other suitable fluid, and the suspension can be cooled to form a first constituent comprising the fluid and a second constituent comprising the electrode active material. Subsequently, the cooled article can be extruded to reduce the lateral dimensions of the fluid and particle constituents. Further extrusion steps (using the bundling procedures outlined here) can also be performed.

The embodiments described herein can permit the manufacturing of ceramic structures with aligned porosity and/or low tortuosity. For example, in certain embodiments, the primary structures and/or electrodes formed therefrom can comprise pores with tortuosities of less than about 1.5, less than about 1.2, or less than about 1.1 (and, in certain embodiments, down to substantially 1). As noted elsewhere, the tortuosity is calculated as the effective path length divided by the projected path length. One of ordinary skill in the art would be capable of determining the tortuosity of a given pore by examining an image (e.g., a magnified image such as a scanning electron micrograph, a microscope enhanced photograph, or an unmagnified photograph), determining the effective path length by measuring the length of the pore along its longitudinal axis, and determining the projected path length by measuring the straight-line distance between the ends of the pore.

In certain embodiments, the primary structures and/or electrodes formed therefrom can comprise one or more pores having a substantially constant cross-sectional shape along essentially the entire length of the pore. For example, the low-tortuosity pores can have a substantially constant cross-sectional shape along essentially the entire length of the pore.

In the set of embodiments where extrusion is used to produce the porous structures, the alignment of the pores can be controlled by aligning the phases that are extruded. In the set of embodiments in which precursor solidification (e.g., crystallization) is employed, the aligned porosity can be generated as a replica of the ice, which has a very low solubility limit for impurities. The growth of the ice along the longitudinal direction (referred to as the a-axis in this set of embodiments) can be 100 times faster than along the radial direction (referred to as the c-axis in this set of embodiments). The differential in the ice crystal growth rate can resulting in the formation of lamellar ice crystals. Furthermore, the imposed temperature gradient can enable continuous growth of the ice, which can lead to the unidirectional pores after sublimation.

The length of the pores can be controlled in the range of several to several hundred millimeters (e.g., between about 1 mm and about 500 mm or between about 1 mm and about 200 mm), or longer. In some embodiments, the pores can span opposing ends of the porous structure (e.g., formed by extrusion and/or directed solidification). In certain embodiments, the average cross-sectional diameters of the pores can be controlled. In some embodiments, the average cross-sectional diameters of the pores within the primary structure (and/or within an electrode formed from a primary structure) can be less than about 100 microns or less than about 10 microns (and/or down to about 0.1 microns or down to about 1 micron). The pore size distribution of the structure, including the average cross-sectional diameter, can be determined by mercury intrusion porosimetry or by the imaging of the microstructure using cross-sections or three-dimensional reconstructions of cross-sections including tomographic methods including X-ray and electron tomography. In certain embodiments, one or more pores (e.g., all of the pores) within a primary structure and/or within an electrode formed therefrom are shaped such that the pore has a substantially constant cross-sectional shape along essentially the entire length of the pore.

The embodiments described herein also allow one to manipulate the porosity and microstructure of the elongated structures by changing the processing parameters. Elongated porous structures (as well as sectioned portions of those structures) can be produced with variable porosity. In the set of embodiments in which directed solidification is used, broad control of the total porosity of the final product is made possible by changing the initial slurry concentration. In the set of embodiments in which extrusion is used to form the elongated porous structures, solidification is used, broad control of the total porosity of the final product is made possible by changing the relative ratios of the first constituent and the second constituent (and/or more constituents) that are extruded, altering (e.g., increasing or decreasing) the number of extrusion steps, and/or via other methods. Porous ceramic specimens with porosity in the range of 30-80%, corresponding to a relative sintering density of 20-70%, can be obtained using the methods described herein.

In the set of embodiments employing directional solidification, the pore size in the porous structure can be selected by varying the concentration of the solid phase in the slurry (e.g., electrode active material such as a ceramic), the freezing rate, and the use of additives, amongst other methods. A lower concentration of suspended solids can allow larger separation distances between the agglomerated solid lamellas (e.g., formed of ceramic) since the growth of the solidifying liquid phase (e.g., ice crystals) is relatively less hindered as the solid particles are pushed at the solidification front. Solid particles in more dilute suspensions travel longer distances and become immobilized when the highest particle packing density is achieved between two growing solidifying portions (e.g., dendritic crystals). Lower solid phase (e.g., ceramic) content can also result in the fewer particles rejected by the solidifying liquid phase (e.g., ice crystals), leading to thinner lamellas in the sintered sample (e.g., a sintered ceramic sample).

In the set of embodiments employing directional solidification, increasing or decreasing the cooling rate can modify the pore size in the final samples. Generally, faster cooling rates (>5° C./min) produce a larger driving force for the nucleation of a larger number of solidifying phases (e.g., ice crystals), and hence, in cases where water is used as the liquid phase of the suspension, a small crystal size for the same amount of water in the slurry. In some embodiments, the cooling rate is in the range of 0.5-20° C./min for the process. In some embodiments, the cooling rate is in the range of 5-20° C./min. One of ordinary skill in the art would be capable of determining the cooling rate of a given process using, for example, a thermocouple, and measuring the rate at which the temperature at the cooled end of the fluid changes.

In the set of embodiments employing directional solidification, further manipulation of the microstructure can be achieved by adding additives to the slurry prior to solidification. Generally, the additive will have a chemical composition that is different that the fluid and the solid particles that are suspended in the fluid. In certain embodiments, the additive can be present in the fluid in an amount between about 1 wt % and about 10 wt %, between about 3 wt % and about 7 wt %, or between about 4 wt % and about 6 wt %. A variety of additives can be added to the fluid. For example, organic solvents or salt can be added, for example, to modify the crystalline structure of the frozen phase (e.g., ice). These additives can influence the morphology of the frozen phase (e.g., ice) and/or change the thickness of the frozen phase (e.g., ice) and/or the orientation of the rejected solid (e.g., ceramic) particles. The pore size and shape may vary accordingly. After subsequent freeze drying, these changes can be replicated in the final structure (e.g., a ceramic structure) and lead to improved performance of the final product. In certain embodiments (e.g., in some embodiments in which water is used as the suspending fluid), the additive can comprise an alcohol (e.g., methanol, ethanol, propanol, and the like) or a sugar (e.g., glucose, sucrose, and the like).

In certain embodiments, the electrodes described herein can comprise low-tortuosity pores. For example, regions 112 of portion 120 in FIG. 1B correspond to low tortuosity pores, which can be formed, for example, when the fugitive constituent is evacuated from the primary structure. In certain embodiments, the low-tortuosity pores can have tortuosities of less than about 1.5, less than about 1.2, less than about 1.1, or substantially 1 (i.e., they can be substantially straight pores). In addition, the electrodes described herein can comprise a matrix constituent (e.g., corresponding to region 110 of portion 120 in FIG. 1B) that is also porous. In general, the tortuosity of the pores within the matrix constituent will be higher than the tortuosity of the low-tortuosity pores. In certain embodiments, the pores within the matrix constituent have a tortuosity of at least about 2, at least about 3, at least about 4, at least about 5 or more (and/or, in certain embodiments, up to about 20 or up to about 10).

In some embodiments the matrix porosity has a topology corresponding to that which is formed between packed powder particles of equiaxed or anisometric shape. Such porosity can be irregular in shape, and can be isotropic in its tortuosity, or can be anisotropic in its tortuosity due to an alignment of anisometric particles or non-uniform particle packing when the matrix is formed. In another embodiment the porosity comprises irregularly-shaped pores that are formed when the matrix constituent is heated to remove binder, solvent, or other constituents. In yet another embodiment the matrix porosity has the topology of pores in a sintered powder compact, being formed by the sintering of matrix powder particles. In this instance, the tortuosity of the matrix can be less than that of a compressed conventional electrode that contains binder and/or fine conductive additives such as carbon blacks.

The electrodes described herein can thus comprise low-tortuosity pores located within a porous matrix having a different, generally higher, tortuosity. For example, in certain embodiments, the tortuosities of the pores within the matrix material can be at least about 0.5 greater, at least about 1.0 greater, at least about 1.5 greater, at least about 2.0 greater, or at least about 5.0 greater (and/or up to about 20 greater or up to about 10 greater) than the tortuosities of the low-tortuosity pores. For example, the low-tortuosity pores may have tortuosities of about 1, and the matrix material may comprise pores with tortuosities of 3, in which case, the tortuosities of the pores within the matrix material would be 2 greater than the tortuosities of the low-tortuosity pores. As noted above, in certain embodiments, the low-tortuosity pores can have tortuosities of less than about 1.5, less than about 1.2, less than about 1.1, or substantially 1 (i.e., they can be substantially straight pores). In some embodiments, the pores within the matrix constituent have a tortuosity of at least about 2, at least about 3, at least about 4, at least about 5 or more (and/or, in certain embodiments, up to about 20 or up to about 10).

In certain embodiments, the low-tortuosity pores can extend from a first external geometric surface of the electrode to a second external geometric surface (e.g., a second surface opposing the first surface) of the electrode. The low-tortuosity pores can have, in some embodiments, a substantially constant cross-sectional shape along essentially the entire length of the pore. In such electrodes, the total porosity of the electrode can be calculated as the sum of the pore volume of the low-tortuosity (e.g., substantially straight) pores and the pore volume of the porous matrix material (e.g., irregularly shaped pores within the porous matrix material). In certain embodiments, distributing the porosity of the electrode in this way (i.e., between low-tortuosity pores and higher tortuosity porosity in the surrounding matrix) can be achieved in a manner that lowers the net tortuosity of the electrode porosity in the direction of transport, as described, for example, in Example 4. For example, introduction of periodic aligned pore channels into a porous matrix (as shown, for example, in FIGS. 1A-1B) can lower the net tortuosity when the total porosity of the electrode is held constant. That is, the aligned porosity comes at the expense of reduced porosity in the matrix.

The "porosity" of such electrodes is expressed as a percentage, and corresponds to the volume occupied by the pores divided by the geometric volume of the electrode. One of ordinary skill in the art would understand that the geometric volume of an electrode corresponds to the volume defined by the external geometric surfaces of the electrode. External geometric surfaces generally conform to the outermost boundaries of the electrode but do not conform to pores or other indentations in the electrode. For example, in FIG. 1A, while first constituent 110 may be porous, boundary 114 still defines a flat, substantially circular external geometric surface of primary structure 100. Pore volumes and porosities can be determined by one of ordinary skill in the art using, for example, mercury intrusion porosimetry, or by the imaging of the microstructure using cross-sections or three-dimensional reconstructions of cross-sections including tomographic methods including X-ray and electron tomography.

As described in Example 4, it has been discovered that electrode performance can be enhanced by adjusting certain parameters. For example, it has been discovered that the total porosity of the electrode and the percentage of the total porosity that is occupied by low tortuosity pores can be adjusted to enhance electrode performance. In addition, it has been discovered that adjusting the ratio of the average cross-sectional diameter of the low-tortuosity pores to the mean pore spacing of the low-tortuosity pores can enhance electrode performance. In addition, adjusting the ratio of the thickness of the electrode to the mean pore spacing of the low-tortuosity pores can enhance electrode performance.

In certain embodiments, an electrode comprising low-tortuosity (e.g., substantially straight) pores within a porous matrix can have a total porosity (counting contributions from both the substantially straight pores and the higher tortuosity pores within the porous matrix in which the low-tortuosity pores are formed) of from about 20% to about 60%, or from about 29% to about 39%. In some such embodiments, the percentage of the total porosity occupied by the low-tortuosity (e.g., substantially straight) pores is from about 20% to about 80%, from about 25% to about 60%, or from about 25% to about 47%. The percentage of total porosity that is occupied by a particular subset of pores is calculated by dividing the volume occupied by the subset of pores by the total volume of all of the pores. For example, to determine the volume occupied by low-tortuosity (e.g., substantially straight) pores, one can perform mercury intrusion porosimetry or direct imaging of the pore microstructure using cross-sections of the material or three-dimensional reconstructions of such cross-sections including tomographic methods including X-ray and electron tomography.

In certain embodiments, the low-tortuosity (e.g., substantially straight) pores within the electrode can be spaced apart from each other to define a mean pore spacing. The mean pore spacing can be determined by examining an image of the electrode, determining the nearest neighbor distance (i.e., the distance of the spatially closest pore) for each pore, and number averaging the nearest neighbor distances. In certain embodiments, the low-tortuosity pores can be spatially arranged to enhance electrode performance. For example, the low-tortuosity pores can be spatially arranged such that the distance over which electrolyte must travel from the low-tortuosity pore to the bulk of the matrix material in which they are formed (which can comprise electrode active material) is not so long that battery performance is inhibited but is also not so short that energy density and specific energy are sacrificed.

In some embodiments, the ratio of the average cross-sectional diameter of the low-tortuosity pores to the mean pore spacing of the low-tortuosity pores can be from about 0.05 to about 1.0, from about 0.2 to about 0.6, or from about 0.4 to about 0.5. In certain embodiments, the ratio of the thickness of the electrode (e.g., dimension 190 in FIG. 1B) to the mean pore spacing of the low-tortuosity pores within the electrode is from about 0.1 to about 30 or from about 0.2 to about 15.

In certain embodiments, the electrode can have a porosity including low-tortuosity (e.g., substantially straight) pores with relatively large average cross-sectional diameters, and higher tortuosity matrix pores (e.g., having any of the tortuosity properties mentioned elsewhere herein) with relatively small average cross-sectional diameters. For example, in certain embodiments, the low-tortuosity (e.g., substantially straight) pores can have average cross-sectional diameters of at least about 100 nanometers, at least about 500 nanometers, at least about 1 micrometer, at least about 5 micrometers, or at least about 10 micrometers, while the ratio of said cross-sectional diameter to the average cross-sectional diameter of the high-tortuosity matrix pores is greater than about 1, greater than about 5, greater than about 10, greater than about 50, or greater than about 100.

As noted above, a variety of electrode active materials can be used in conjunction with the embodiments described herein (e.g., in the matrix constituent), and can be incorporated into a finished electrode structure. Electrodes for use in electrochemical systems that utilize various working ions are contemplated, including systems in which $H^+$; $OH^-$; $Li^+$, $Na^+$, and/or other alkali ions; $Ca^{2+}$, $Mg^{2+}$ and/or other alkaline earth ions; and/or $Al^{3+}$ are used as the working ions. In addition, the electrode active material can include aqueous and/or non-aqueous components. In each of these instances, a negative electrode storage material and a positive electrode storage material may be required, the negative electrode storing the working ion of interest at a lower absolute electrical potential than the positive electrode. The cell voltage can be determined approximately by the difference in ion-storage potentials of the two ion-storage electrode materials.

In some embodiments, an organic electrode active material is used that stores the working ion of interest at a potential useful for either the positive or negative electrode of a battery. Such organic electrode active materials include "p"-doped conductive polymers such as polyaniline or polyacetylene based materials, polynitroxide or organic radical electrodes (such as those described in: H. Nishide et al., *Electrochim. Acta*, 50, 827-831, (2004), and K. Nakahara, et al., *Chem. Phys. Lett.*, 359, 351-354 (2002)), carbonyl based organics, and oxocarbons and carboxylate, including compounds such as $Li_2C_6O_6$, $Li_2C_8H_4O_4$, and $Li_2C_6H_4O_4$ (see for example M. Armand et al., *Nature Materials, DOI:* 10.1038/nmat2372).

Other suitable positive electrode active materials include solid compounds known to those skilled in the art as those used in NiMH (Nickel-Metal Hydride) Nickel Cadmium (NiCd) batteries. Still other positive electrode active materials for Li storage include those used in carbon monofluoride batteries, generally referred to as $CF_R$, or metal fluoride compounds having approximate stoichiometry $MF_2$ or $MF_3$ where M comprises Fe, Bi, Ni, Co, Ti, V. Examples include those described in H. Li, P. Balaya, and J. Maier, Li-Storage via Heterogeneous Reaction in Selected Binary Metal Fluorides and Oxides, *Journal of The Electrochemical Society*, 151 [11] A1878-A1885 (2004), M. Bervas, A. N. Mansour, W.-S. Woon, J. F. Al-Sharab, F. Badway, F. Cosandey, L. C. Klein, and G. G. Amatucci, "Investigation of the Lithiation and Delithiation Conversion Mechanisms in a Bismuth Fluoride Nanocomposites", J. Electrochem. Soc., 153, A799

(2006), and I. Plitz, F. Badway, J. Al-Sharab, A. DuPasquier, F. Cosandey and G. G. Amatucci, "Structure and Electrochemistry of Carbon-Metal Fluoride Nanocomposites Fabricated by a Solid State Redox Conversion Reaction", *J. Electrochem. Soc.*, 152, A307 (2005).

As another example, fullerenic carbon including single-wall carbon nanotubes (SWNTs), multiwall carbon nanotubes (MWNTs), or metal or metalloid nanowires may be used as electrode active materials. One example includes the silicon nanowires used as a high energy density storage material in a report by C. K. Chan, H. Peng, G. Liu, K. McIlwrath, X. F. Zhang, R. A. Huggins, and Y. Cui, High-performance lithium battery anodes using silicon nanowires, *Nature Nanotechnology*, published online 16 Dec. 2007; doi:10.1038/nnano.2007.411.

Exemplary electrode active materials for a positive electrode in a lithium system include the general family of ordered rocksalt compounds $LiMO_2$ including those having the $\alpha$-$NaFeO_2$ (so-called "layered compounds") or orthorhombic-$LiMnO_2$ structure type or their derivatives of different crystal symmetry, atomic ordering, or partial substitution for the metals or oxygen. In such embodiments, M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, $Li(Ni, Co, Al)O_2$ (known as "NCA") and $Li(Ni, Mn, Co)O_2$ (known as "NMC"). Other families of exemplary electrode active materials include those of spinel structure, such as $LiMn_2O_4$ and its derivatives, "high voltage spinels" with a potential vs. $Li/Li^+$ that exceeds 4.3V including but not limited to $LiNi_{0.5}Mn_{1.5}O_4$, so-called "layered-spinel nanocomposites" in which the structure includes nanoscopic regions having ordered rocksalt and spinel ordering, olivines $LiMPO_4$ and their derivatives, in which M comprises one or more of Mn, Fe, Co, or Ni, partially fluorinated compounds such as $LiVPO_4F$, other "polyanion" compounds, and vanadium oxides $V_xO_y$ including $V_2O_5$ and $V_6O_{11}$.

In one or more embodiments, an electrode active material comprises a transition metal polyanion compound, for example as described in U.S. Pat. No. 7,338,734. In one or more embodiments, an electrode active material comprises an alkali metal transition metal oxide or phosphate, and for example, the compound has a composition $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, and have values such that x, plus y(1−a) times a formal valence or valences of M', plus ya times a formal valence or valence of M", is equal to z times a formal valence of the $XD_4$, $X_2D_7$, or $DXD_4$ group; or a compound comprising a composition $(A_{1-a}M''_a)_xM'_y(XD_4)_z$, $(A_{1-a}M''_a)_xM'_y(DXD_4)z(A_{1-a}M''_a)_xM'_y(X_2D_7)_z$ and have values such that (1−a)x plus the quantity ax times the formal valence or valences of M" plus y times the formal valence or valences of M' is equal to z times the formal valence of the $XD_4$, $X_2D_7$ or $DXD_4$ group. In such compounds, A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen. The positive electroactive material can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive electrode active material comprises a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In other embodiments, the lithium transition metal phosphate material has an overall composition of $Li_{1-x-z}M_{1+z}PO_4$, where M comprises at least one first row transition metal selected from the group consisting of Ti, V, Cr, Mn, Fe, Co and Ni, where x is from 0 to 1 and z can be positive or negative. In some embodiments, M includes Fe, and z is between about 0.15 and −0.15. The material can exhibit a solid solution over a composition range of 0<x<0.15, or the material can exhibit a stable solid solution over a composition range of x between 0 and at least about 0.05, or the material can exhibit a stable solid solution over a composition range of x between 0 and at least about 0.07 at room temperature (22-25° C.). The material may also exhibit a solid solution in the lithium-poor regime, e.g., where x≥0.8, or x≥0.9, or x≥0.95.

In some embodiments an electrode active material comprises a metal salt that stores an alkali ion by undergoing a displacement or conversion reaction. Examples of such compounds include metal oxides such as CoO, $Co_3O_4$, NiO, CuO, MnO, typically used as a negative electrode in a lithium battery, which upon reaction with Li undergo a displacement or conversion reaction to form a mixture of $Li_2O$ and the metal constituent in the form of a more reduced oxide or the metallic form. Other examples include metal fluorides such as $CuF_2$, $FeF_2$, $FeF_3$, $BiF_3$, $CoF_2$, and $NiF_2$, which undergo a displacement or conversion reaction to form LiF and the reduced metal constituent. Such fluorides may be used as the positive electrode in a lithium battery. In other embodiments an electrode active material comprises carbon monofluoride or its derivatives.

In some embodiments the energy storage device (e.g., containing one or more of the electrodes described herein) is a lithium-based energy storage device (e.g., a lithium-based battery), and the negative electrode active compound comprises graphite, graphitic boron-carbon alloys, hard or disordered carbon, lithium titanate spinel, and/or a solid metal, metal alloy, metalloid and/or metalloid alloy that reacts with lithium to form intermetallic compounds, including the metals Sn, Bi, Zn, Ag, and Al, and the metalloids Si and Ge. In some embodiments, $Li_4Ti_5O_{12}$ can be included as an electrode active material (e.g., a negative electrode active material).

Exemplary electrode active materials for a negative electrode in the case of a lithium working ion include graphitic or non-graphitic carbon, amorphous carbon, or mesocarbon microbeads; an unlithiated metal or metal alloy, such as metals including one or more of Ag, Al, Au, B, Ga, Ge, In, Sb, Sn, Si, or Zn, or a lithiated metal or metal alloy including such compounds as LiAl, $Li_9Al_4$, $Li_3Al$, LiZn, LiAg, $Li_{10}Ag_3$, $Li_5B_4$, $Li_7B_6$, $Li_{12}Si_7$, $Li_{21}Si_8$, $Li_{13}Si_4$, $Li_{21}Si_5$, $Li_5Sn_2$, $Li_{13}Sn_5$, $Li_7Sn_2$, $Li_{22}Sn_5$, $Li_3Sb$, $Li_3Sb$, LiBi, or $Li_3Bi$, or amorphous metal alloys of lithiated or non-lithiated compositions.

In some embodiments, oxides of general formula $A_xM_yO_z$ may be used as electrode active materials, wherein A comprises a working ion that may be one or more of Na, Li, K, Mg, Ca, and Al; M comprises a transition metal that changes its formal valence state as the working ion is intercalated or deintercalated from the compound; 0 corresponds to oxygen; x can have a value of 0 to 10; y can have a value of 1 to 3; and z can have a value of 2 to 7.

The electrode active material can include one or more lithium metal "polyanion" compounds, including but not limited to compounds described in U.S. Pat. No. 7,338,734, to Chiang et al. which is incorporated herein by reference in its entirety for all purposes. Such compounds include the compositions $(A)_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, wherein A is at least one of an alkali metal or hydrogen, M' is a first-row transition metal, X is at least one of phosphorus, sulfur, arsenic, boron, aluminum, silicon, vanadium, molybdenum and tungsten, M'' is any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0 \le a \le 0.1$, x is equal to or greater than 0, y and z are greater than 0 and have values such that x, plus y(1−a) times a formal valence or valences of M', plus ya times a formal valence or valence of M'', is equal to z times a formal valence of the $XD_4$, $X_2D_7$, or $DXD_4$ group. In some embodiments, the compound crystallizes in an ordered or partially disordered structure of the olivine ($A_xMXO_4$), NASICON ($A_x(M',M'')_2(XO_4)_3$), $VOPO_4$, $LiFe(P_2O_7)$ or $Fe_4(P_2O_7)_3$ structure-types, and has a molar concentration of the metals (M'+M'') relative to the concentration of the elements X that exceeds the ideal stoichiometric ratio y/z of the prototype compounds by at least 0.0001.

Other such compounds comprise the compositions $(A_{1-a}M''_a)_xM'_y(XD_4)_z$, $(A_{1-a}M''_a)_xM'_y(DXD_4)_z$, or $(A_{1-a}M''_a)_xM'_y(X_2D_7)_z$, wherein A is at least one of an alkali metal or hydrogen; M' is a first-row transition metal; X is at least one of phosphorus, sulfur, arsenic, boron, aluminum, silicon, vanadium, molybdenum and tungsten; M'' any of a Group IIA, IIIA, IVA, VA, VIA, VIIA, VIIIA, IB, IIB, IIIB, IVB, VB, and VIB metal; D is at least one of oxygen, nitrogen, carbon, or a halogen; $0 \le a \le 0.1$; and x, y, and z are greater than zero and have values such that $(1-a)_x$ plus the quantity ax times the formal valence or valences of M'' plus y times the formal valence or valences of M' is equal to z times the formal valence of the $XD_4$, $X_2D_7$ or $DXD_4$ group. In some of these embodiments, the compound crystallizes in an ordered or partially disordered structure of the olivine ($A_xMXO_4$), NASICON ($A_x(M',M'')_2(XO_4)_3$), $VOPO_4$, $LiFe(P_2O_7)$ or $Fe_4(P_2O_7)_3$ structure-types, and has a molar concentration of the metals (M'+M'') relative to the concentration of the elements X that exceeds the ideal stoichiometric ratio y/z of the prototype compounds by at least 0.0001.

Still other such compounds comprise the compositions $(A_{b-a}M''_a)_xM'_y(XD_4)_z$, $(A_{b-a}M''_a)_xM'_y(DXD_4)_z$, or $(A_{b-a}M''_a)_xM'_y(X_2D_7)_z$, wherein A is at least one of an alkali metal or hydrogen; M' is a first-row transition metal; X is at least one of phosphorus, sulfur, arsenic, boron, aluminum, silicon, vanadium, molybdenum and tungsten; M'' any of a Group IIA, IIIA, IVA, VA, VIA, VIIA, VIIIA, IB, IIB, IIIB, IVB, VB, and VIB metal; D is at least one of oxygen, nitrogen, carbon, or a halogen; $0 \le a \le 0.1$; $a \le b \le 1$; and x, y, and z are greater than zero and have values such that $(b-a)_x$ plus the quantity ax times the formal valence or valences of M'' plus y times the formal valence or valences of M' is equal to z times the formal valence of the $XD_4$, $X_2D_7$ or $DXD_4$ group. In some of these embodiments, the compound crystallizes in an ordered or partially disordered structure of the olivine ($A_xMXO_4$), NASICON ($A_x(M',M'')_2(XO_4)_3$), $VOPO_4$, $LiFe(P_2O_7)$ or $Fe_4(P_2O_7)_3$ structure-types, and has a molar concentration of the metals (M'+M'') relative to the concentration of the elements X that exceeds the ideal stoichiometric ratio y/z of the prototype compounds by at least 0.0001.

Other rechargeable lithium batteries can include the following combinations of cathode active materials/anode active materials: $LiMn_2O_4/VO_2$, $Li(Ni_{1-x}Co_x)O_2/LiV_3O_8$, $LiCoO_2/LiV_3O_8$, $LiMn_2O_4/TiP_2O_7$, $LiMn_2O_4/LiTi_2(PO_4)_3$, $Li(Ni_{0.33}Mn_{0.33}Co_{0.33})O_2/Li_xV_2O_5$, $V_2O_5/Li_xV_2O_5$, $LiMn_2O_4/Li_xV_2O_5$, $LiMn_2O_4/NaTi_2(PO_4)_3$, $LiMn_2O_4/Li_3Fe_2(PO_4)_3$, $LiMn_2O_4/LiFeP_2O_7$, $LiMn_2O_4/LiFe_4(P_2O_7)_3$, $LiCoO_2/C$, $Li_{0.5}Mn_2O_4/LiCoO_2$, $\gamma$-$MnO_2/Zn$, and $TiO_2$ (anatase)/Zn.

In some embodiments, a positive electrode active material can comprise a material of the general formula $Li_xFe_yP_aO_z$, (wherein, for example, x can be between about 0.5 and about 1.5, y can be between about 0.5 and about 1.5, a can be between about 0.5 and about 1.5, and z can be between about 3 and about 5), and a negative electrode active material comprising a material of the general formula $Li_{x'}Ti_{y'}O_{z'}$ (wherein, for example, x' can be between about 3 and about 5, y' can be between about 4 and about 6, and z' can be between about 9 and about 15 or between about 11 and about 13). As a specific example, in some embodiments, the negative electrode active material can comprise $LiFePO_4$ and the positive electrode active material can comprise $Li_4Ti_5O_{12}$. In some embodiments, the positive and/or negative electrode active materials can include cation or anion doped derivatives of these compounds.

Other specific combinations of electrode active materials that can be used in the electrodes described herein (listed here as anode/cathode pairs) include, but are not limited to, $LiV_3O_8/LiCoO_2$; $LiV_3O_8/LiNiO_2$; $LiV_3O_8/LiMn_2O_4$; and $C/Na_{0.44}MnO_2$.

Sodium can be used as the working ion in conjunction with cathode active or anode active compounds that intercalate sodium at suitable potentials, or that store sodium by surface adsorption and the formation of an electrical double layer as in an electrochemical capacitor or by surface adsorption accompanied by charge transfer. Materials for such systems have been described in US Patent Application US 2009/0253025, by J. Whitacre, for use in conventional secondary batteries.

Cathode active materials that can be used include, but are not limited to, layered/orthorhombic $NaMO_2$ (birnessite), cubic spinel $\lambda$-$MnO_2$ based compounds, $Na_2M_3O_7$, $NaMPO_4$, $NaM_2(PO_4)_3$, $Na_2MPO_4F$, and tunnel-structured $Na_{0.44}MO_2$, where M is a first-row transition metal. Specific examples include $NaMnO_2$, $Li_xMn_2O_4$ spinel into which Na is exchanged or stored, $Li_xNa_yMn_2O_4$, $Na_yMn_2O_4$, $Na_2Mn_3O_7$, $NaFePO_4$, $Na_2FePO_4F$, and $Na_{0.44}MnO_2$. Anode active materials can include materials that store sodium reversibly through surface adsorption and desorption, and include high surface area carbons such as activated carbons, graphite, mesoporous carbon, carbon nanotubes, and the like. They also may comprise high surface area or mesoporous or nanoscale forms of oxides such as titanium oxides, vanadium oxides, and compounds identified above as cathode active materials but which do not intercalate sodium at the operating potentials of the negative electrode.

In addition to methods of making porous materials described herein, electrodes (e.g., battery electrodes) and batteries comprising electrodes are also provided. For example, one aspect relates to battery electrodes (e.g., for use in rechargeable or non-rechargeable batteries) made according to any of the methods and/or using any of the systems described herein. In one set of embodiments, a battery (e.g., a rechargeable or non-rechargeable battery) comprising an electrode obtainable by any of the methods and/or using any of the systems described herein are provided. In certain embodiments, such electrodes and/or batteries are configured for use in systems in which the working ion is lithium.

U.S. Provisional Patent Application Ser. No. 61/473,119, filed Apr. 7, 2011, and entitled "Controlled Porosity in Electrodes" is incorporated herein by reference in its entirety for all purposes.

The following examples are intended to illustrate certain embodiments of the present invention, but do not exemplify the full scope of the invention.

Example 1

This example describes the manufacture of a high energy density low tortuosity electrode by co-extrusion. Ceramic-filled thermoplastic formulations, as shown in Table I, were prepared by blending a fine powder (an active cathode material $LiCoO_2$ or, in the case of a fugitive material, carbon black), thermoplastic polymeric binder, and optionally one or more processing aids. Compositions of ceramic-filled thermoplastic compounds are listed in Table I. Poly Ethylene-co-ethyl acrylate (EEA 6182; Union Carbide, Danbury, Conn.) and Poly isobutyl methacrylate (Acryloid B67; Rohm and Haas, Philadelphia, Pa.) resins were employed as thermoplastic polymer binders for the co-extrusion process. Adding processing aids reduced the viscosity of the polymer and aided in dispersion of the powder, which controlled a consistent apparent rheological flow behavior of the different extrusion compounds. Thermoplastic binders were fused at 120° C. in a heated shear mixer (PlasticCorder PL 2100 Electronic Torque Rheometer; C. W. Brabender, South Hackensack, N.J.). Powder ($LiCoO_2$ or carbon black) and processing aids such as heavy mineral oil (Kaydol; Sonneborn, Petrolia, Pa.), Polyethylene glycol (PEG 1000; Acros Organics, N.J., USA), and Stearic Acid (A12244; Alfa Aesar, Ward Hill, Mass.) were then gradually added to the melted binders.

Figure 4:
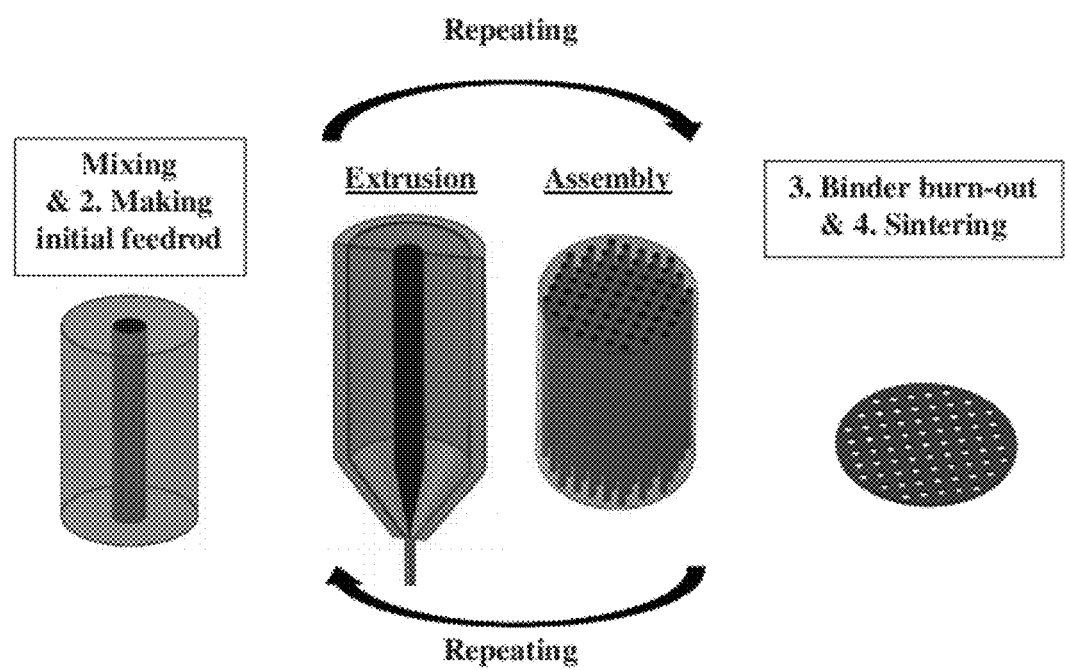
FIG. 4 is a schematic diagram illustrating a co-extrusion process that can be used to form structures comprising elongated regions, according to certain embodiments.
Figure 5A:
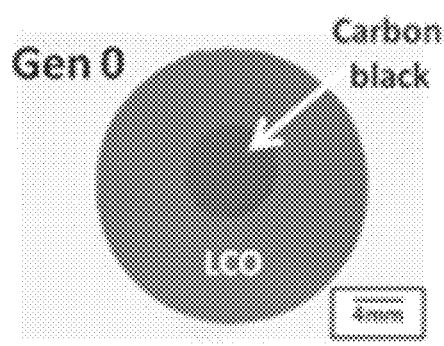
FIGS. 5A-5D are, according to one set of embodiments, photographs of green (unsintered) bodies prepared by a co-extrusion process.
Figure 5B:
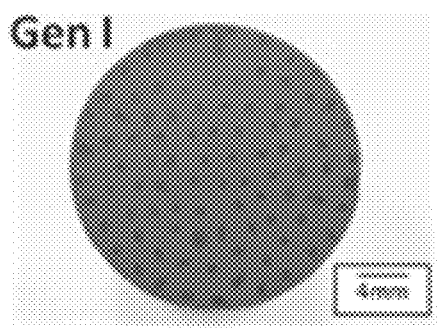
Figure 5C:
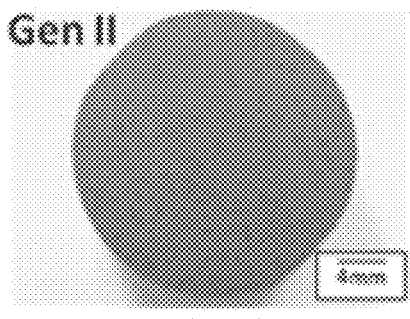
Figure 5D:
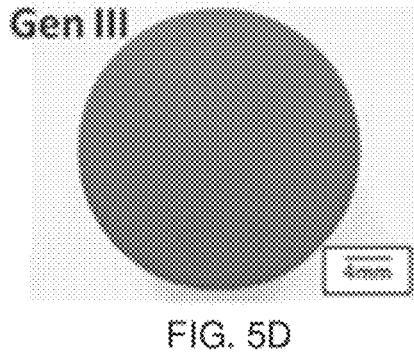
Figure 6A:
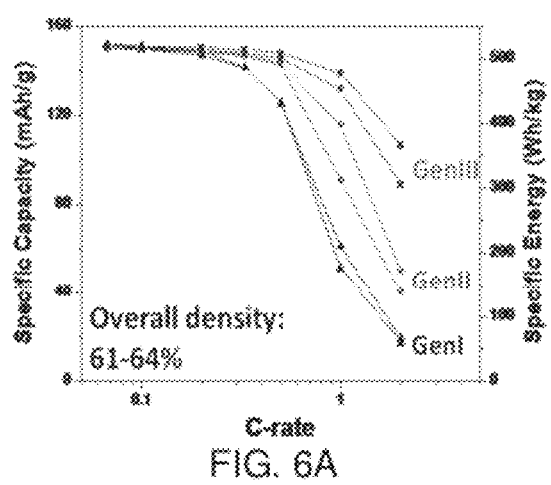
FIGS. 6A-6D are plots of (A and C) specific capacity as a function of C-rate and (B and D) voltage as a function of capacity for Gen I, Gen II, and Gen III electrodes and 62% and 70% overall density, according to certain embodiments.
Figure 6B:
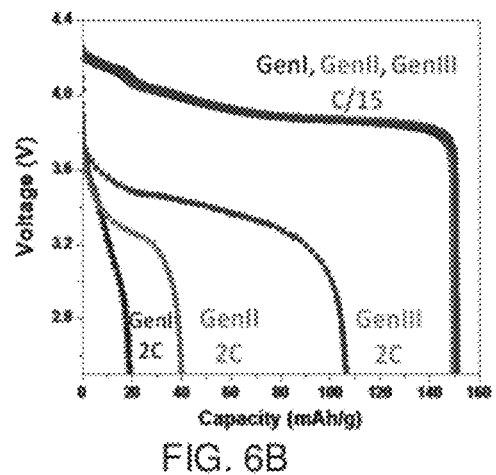
Figure 6C:
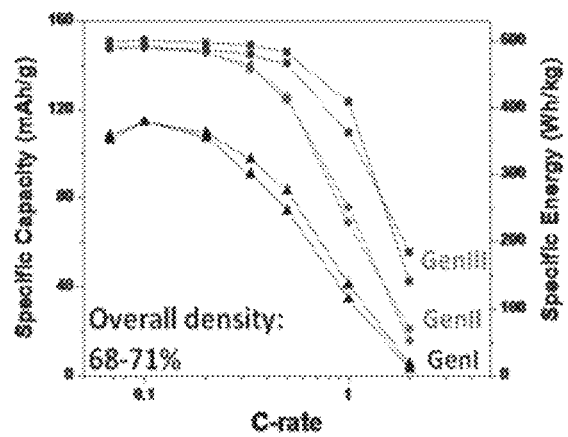
Figure 6D:
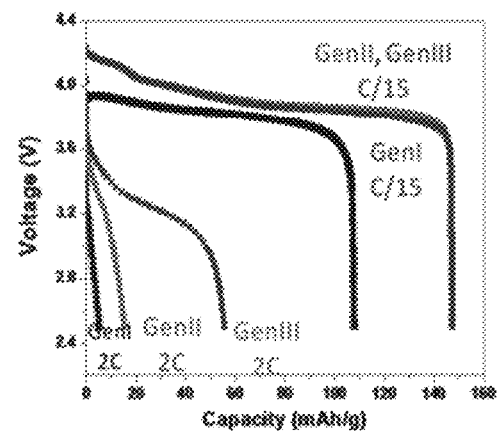

FIG. 4 includes a schematic illustration outlining the co-extrusion process used to make the structures comprising low-tortuosity pores described in this example. FIGS. 5A-5D are photographs of green (unsintered) bodies prepared by the co-extrusion process. Black dots in the each assembled structure are composed of Carbon black and polymeric binder, generating aligned macro-pore channels after binder-burn out and sintering.

Once blended, a carbon black thermoplastic compound was uniaxially warm-pressed into a 7 mm cylindrical die at 10 MPa and 145° C. The $LiCoO_2$ thermoplastic compound was warm-pressed into a 22 mm cylindrical die under the same pressure and temperature, and then machined to form a 7 mm diameter hole at the center of the initial feedrod. To create an initial feedrod (Gen 0 shown in FIG. 5A), the carbon black cylindrical rod was inserted into the hole at the center of the $LiCoO_2$ feedrod, and then warm-pressed into a 22 mm cylindrical die at the same pressure and temperature. The initial feedrod (D: 22 mm×L: 7 cm) was then extruded through a symmetric 11:1 circle reduction die using a piston extruder at 110° C. The material exiting the die, or extrudate, had a cross sectional shape identical to that of the feedrod, while both diameters were reduced by a factor of 11 as Gen I, shown in FIG. 5B.

The extruded fiber was then sliced into segments of equal length and assembled into a structure with a diameter equal to the initial feedrod diameter. The individual fibers were uniaxially pressed at 10 MPa and 145° C. to create the second feedrod. After second extrusion (Gen II shown in FIG. 5C), the initial repeat unit had undergone a total size reduction of 121 times. The 22 mm green repeat unit was reduced to 182 μm. At this point, the assembled structure was ready to undergo thermal treatment resulting in binder burnout followed by sintering of the active material powder (Table II), yielding a ceramic monolith. Alternatively, extruded fiber can be passed through the reduction die and assembled repeatedly, with each pass yielding another 11-fold reduction in the feature size ($2^{nd}$ and $3^{rd}$ passes labeled Gen II and Gen III), with burnout and sintering as the final step in the process. After the binder burn-out step, aligned pore channels were formed from fugitive carbon black compounds. The feedrod and channel diameters in the initial feedrod were chosen to be 22 and 7.5 mm, respectively. After three iterations (Gen III shown in FIG. 5D) and sintering, a partially porous monolith with aligned channels of 6 micron diameter, with a channel-channel spacing of about 17 microns was produced. Given the different sintering conditions, two samples were prepared, each substantially identical except for differences in the overall densities, to test electrochemical performance. As shown in Table III, electrodes sintered at 1000° C. (overall relative density of 62%, corresponding to about 75% density in the "matrix" phase) were slightly more porous than those sintered at 1050° C. (overall relative density of 70%, corresponding to about 81% density in the "matrix" phase), while both electrodes had substantially the same lateral diffusion length for every iteration (Gen I, Gen II, and Gen III).

Green (unsintered) Gen III electrodes were cut 0.5 mm-thick by using a diamond slicing wheel. After binder burn-out and sintering followed by the process in Table 2, the electrodes were lapped to 220 micrometer thickness, diced into square pieces of 6 mm edge length, polished and tested in swagelok cells against a Li reference anode. Square samples (6 mm×6 mm) were electrochemically tested against lithium in custom-made Swagelok cells with stainless-steel current collectors. A piece of lithium foil was pressed onto a collector, two layers of Celgard 2500 microporous separator placed over it, and a cathode square centered over the separator. Electrolyte (1.3 M $LiPF_6$ in a blend of organic carbonates) was added to cover the stack. Pressure was applied to seal the cell and also ensured electrical contact between $LiCoO_2$ and the cathode-side collector. Cells were cycled using a galvanostat/potentiostat/impedance analyzer (Bio-logic VMP3). CCCV charging was used, with constant (C/15) current applied until cell voltage reached a selected value (4.25 V). This voltage was held until current decayed to a chosen cutoff (C/50). A 1-h rest step followed, after which cells were galvanostatically discharged at various rates to 2.5 V.

Presented in FIGS. 6A-6D are rate testing results, where each electrode was charged at C/15 rate and discharged at various rates in the C/15-2C range. Data is shown from all generations of the co-extruded electrode material. The panels on the top (FIGS. 6A-6B) show data from material sintered at 1000° C. (overall relative density of 62%, corresponding to about 75% density in the "matrix" phase). The panels on the bottom (FIGS. 6C-6D) show capacity achieved for otherwise identical samples except for a sintering temperature of 1050° C. yielding an overall density of 70% (corresponding to a matrix density of about 81%). Within each set of results, each generation displays improved rate performance than the preceding generation. At low discharge rates (C/15), voltage versus capacity appeared essentially identical for different generations, implying small concentration and voltage drops across all samples. As the discharge rate was increased, both the capacity delivered and the voltage as a function of capacity began to diverge among different generations. Not wishing to be bound by any particular theory, this may have been largely due to the divergence of the lithium ion concentration drop across the different electrodes at higher discharge rates, with the electrodes with the finest channel spacings (about 15 microns) possessing the most facile transport kinetics. Each generation was identical to the previous one except for unit cell size; thus, there is a strong suggestion that the reduction of the channel spacing in relation to the diffusion length across the matrix was effective in enhancing ion-transport across the electrode. In addition, it was found that increasing the matrix density by going to a higher sintering temperature resulted in decreased capacity for the same electrode thickness; for instance, a Gen III cathode of 220 micron thickness and sintered at 1000° C. was capable of delivering >90% of the full capacity at 1C discharge rate; for the corresponding cathode sintered at 1050° C., the value dropped to about 84%. When matrix density was increased, two processes took place, either/both of which might readily explain this observation: first, capacity per area of the electrode and thus current across the electrode for a given C-rate was increased, increasing the concentration drop across channels. At the same time, the effective diffusion constant for ion transport across the matrix dropped due to closing of pores and the increase of matrix tortuosity, implying that a smaller region around each channel is accessible by diffusion.

TABLE I

Composition of Ceramic-Filled Thermoplastic Compounds

| Component | Density (g/cm$^3$) | Wt % | Vol % | Binder (wt %) |
|---|---|---|---|---|
| Lithium Cobalt Oxide | 5.01 | 84.53 | 51.24 | — |
| Poly Ethylene-co-Ethyl Acrylate | 0.93 | 9.02 | 29.47 | 58.35 |
| Poly Isobutyl Methacrylate | 1.03 | 4.29 | 12.64 | 27.72 |
| Stearic Acid | 0.85 | 0.27 | 0.98 | 1.76 |
| Heavy Mineral Oil | 0.88 | 0.68 | 2.36 | 4.39 |
| Poly Ethylene Glycol | 1.1 | 1.20 | 3.32 | 7.78 |

TABLE II

Thermoplastic Binder Removal and Sintering Schedules

| Steps | Temp. (° C.) | Heating rate (° C./hour) | Holding time (hour) |
|---|---|---|---|
| BBO | 20-220 | 180 | 1 |
|  | 220-360 | 30 | 2 |
|  | 360-440 | 15 | 2 |
|  | 440-485 | 15 | 2 |
|  | 485-600 | 180 | 2 |
| Sintering | 600-1050 | 600 | 6 |
| Cooling | 600-25 | 300 |  |

TABLE III

Microstructure Information of Extruded Electrodes prepared from sintering at 1000° C. and 1050° C.; Pore Size, Lateral diffusion length, and Density

|  |  | Gen I | Gen II | Gen III |
|---|---|---|---|---|
| 1000° C. & 1050° C. | Mean pore diameter | 0.68 mm | 0.06 mm | 0.006 mm |
|  | Mean pore channel spacing | 1.32 mm | 0.12 mm | 0.015 mm |
| 1000° C. | Overall density Matrix density |  |  | 61-64% 73-76% |
| 1050° C. | Overall density Matrix density |  |  | 68-71% 80-83% |

Example 2

This example describes the production of a LiCoO$_2$ electrode with oriented pore structure by directional freeze-casting and sintering.

The freeze casting method can produce LiCoO$_2$ electrodes with a desirable aligned porosity and low tortuosity. The experiments in this example were carried out with a LiCoO$_2$ slurry. The slurry contained 10-30 vol % LiCoO$_2$ powder in water. Slurries were prepared by mixing distilled water with a small amount (1 wt % based on ceramic powder) of ammonium polymethacrylate anionic dispersant (DarvanC, R. T. Vanderbilt Co., Norwalk, Conn.), an organic binder (2 wt %) and the LiCoO$_2$ powder in various content. Slurries were ball-milled for 24 hours with alumina balls and de-aired by stirring in a vacuum desiccator for 30 minutes.

Figure 7A:
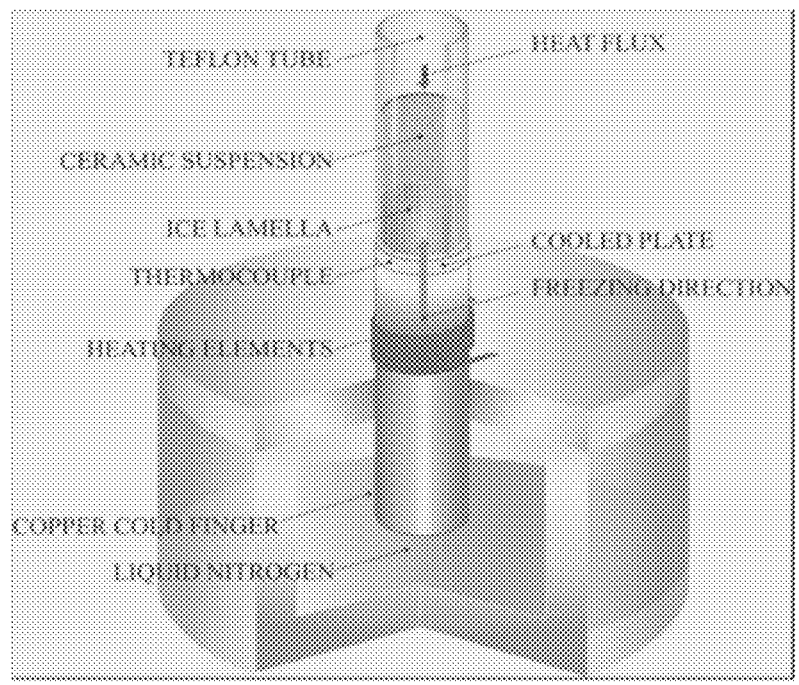
FIGS. 7A-7B are, according to some embodiments, (A) a schematic representation of an apparatus for freeze casting which solidifies a ceramic slurry at a controlled freezing rate and (b) a schematic illustration showing ice crystal formation during freezing of a ceramic slurry.

In this example, a LiCoO$_2$ structure was produced by the following method:

The LiCoO$_2$ slurry was poured into the Teflon mold mounted on a cooled Cu plate, as illustrated schematically in FIG. 7A. The temperature of the Cu plate was controlled using liquid nitrogen and a heating ring. The height of the LiCoO$_2$ slurry was 40 mm, and the diameter of the Cu plate was 20 mm. After an initial temperature equilibration, the Cu plate was cooled at a rate of 5° C./min to −150° C. The frozen specimens were freeze dried (Freeze dryer 8, Labconco, Kansas City, Mo.) at low temperature (−50° C.) and low pressure (2.0 Pa) for 24 hours. The resulting green samples were sintered at 1100° C. for 4 hours in an air furnace, using heating and cooling rates of 5° C./min.

Figure 7B:
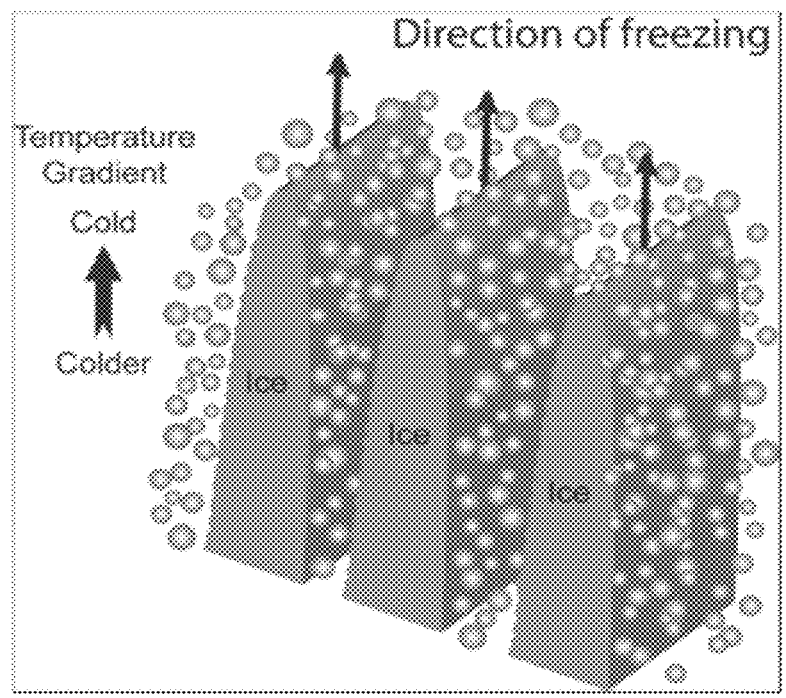
Figure 8A:
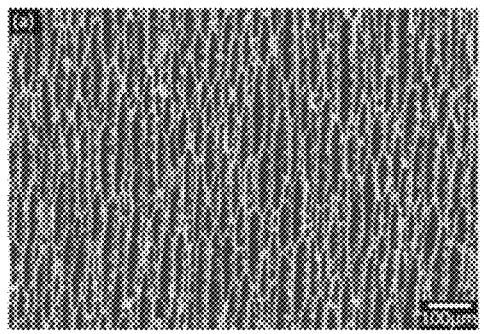
FIGS. 8A-8F are, according to certain embodiments, scanning electron microscopy (SEM) micrographs of sintered $LiCoO_2$ specimens fabricated from slurries with ceramic contents of (A-B) 10 vol %, (C-D) 20 vol %, and (E-F) 30 vol %, each of which were cooled at 5° C./min.
Figure 8B:
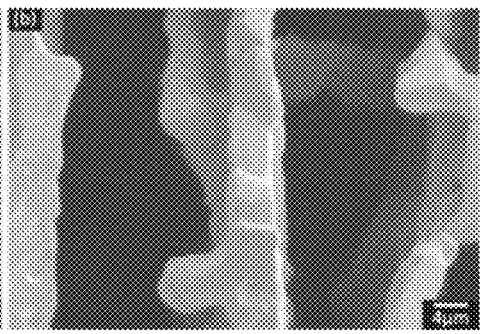
Figure 8C:
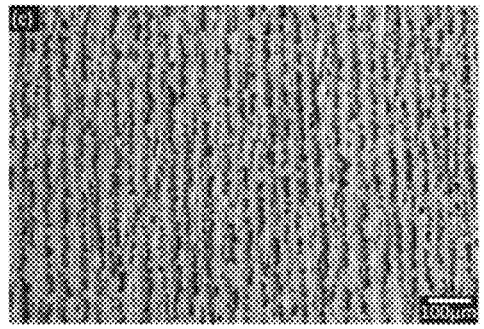
Figure 8D:
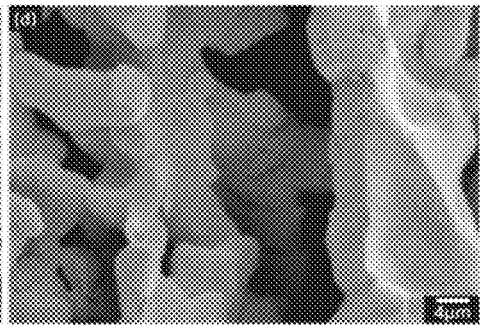
Figure 8E:
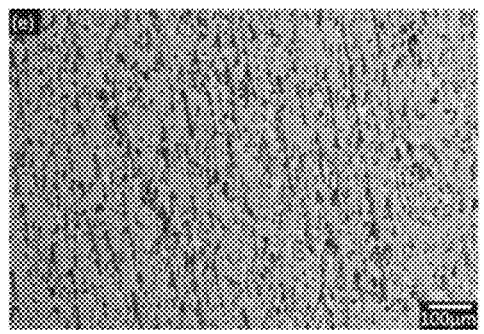
Figure 8F:
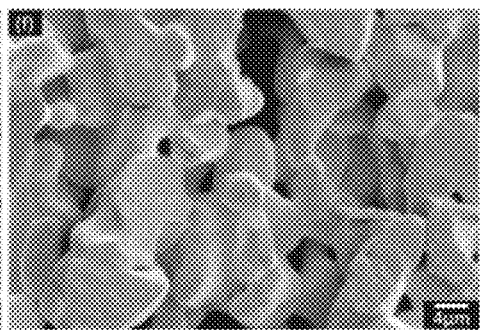
Figure 9:
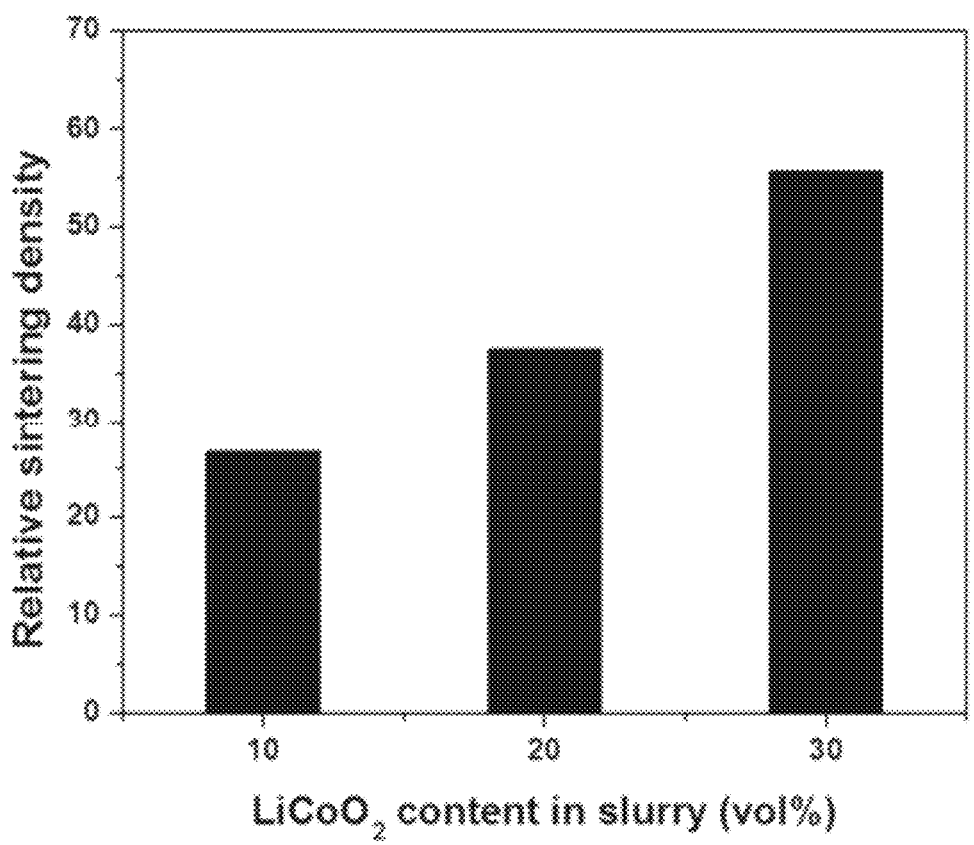
FIG. 9 is a plot of relative sintering density versus the initial ceramic content in a slurry of freeze-cast $LiCoO_2$ specimens, in which the slurries were cooled at 5° C./min, according to one set of embodiments.

LiCoO$_2$ electrodes produced from a low LiCoO$_2$ content (10-20 vol %) slurry according to this method included aligned pores (10-30 μm in width) distributed homogenously as shown in FIGS. 8A-8F. The pore morphology was a replica of the ice crystals formed in the slurries, illustrated schematically in FIG. 7B. During the freezing process, the ice crystals formed in the slurry and repelled the ceramic particles. The temperature gradient imposed by the Cu plate led to a preferential growth of these crystals from the bottom to the top, and produced the unidirectional pores with low tortuosity. A higher LiCoO$_2$ content in the slurry resulted in a higher sintering density as shown in the plot of FIG. 9, which was beneficial for a higher energy density. However, for the electrode prepared from 30 vol % slurry, the porosity was less aligned and higher tortuosity appeared in the macroscopic study (see, e.g., FIGS. 8E-8F). Not wishing to be bound by any particular theory, this may have been because the interaction between the particles in the slurry became more important and the particles could not be repelled from the ice under such freezing conditions (5° C./min).

Example 3

Figure 10A:
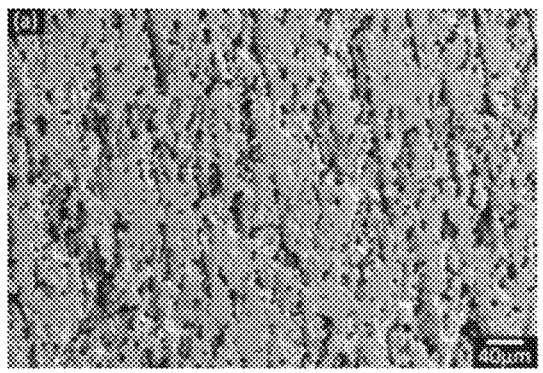
FIGS. 10A-10D are SEM micrographs of sintered $LiCoO_2$ specimens fabricated from slurries with 30 vol % ceramic content. The slurries were cooled at (A) 5° C./min and (B-D) 1° C./min. Additives of (C) 5 wt % ethanol and (D) 5 wt % sucrose were added to the slurries prior to freezing.
Figure 10B:
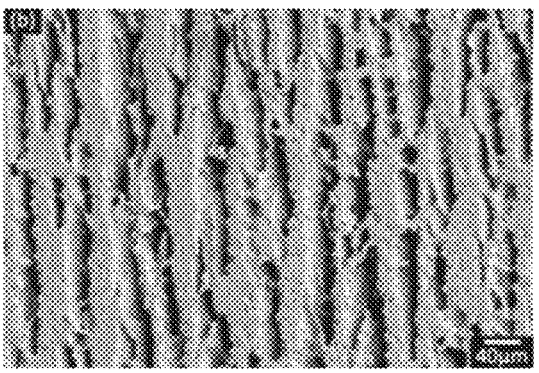

This example describes the production of a high density sintered LiCoO$_2$ electrode with less tortuosity using directional freeze-casting. Preparation of high density sintered LiCoO$_2$ electrodes with aligned pore structure and less tortuosity (using the process outlined in Example 2 and illustrated in FIGS. 7A-7B) was enhanced by controlling the morphology of the ice crystals. For this purpose, a slower freezing rate (1° C./min) was used during the cooling process and suitable additives were added to the slurry prior to freeze casting. In this example, 5 wt % sucrose and ethanol were added to the 30 vol % LiCoO$_2$ slurry described in Example 2. The ceramic content in the slurry was 30 vol % in order to achieve a relative sintering density higher than 50%. Further processing of the specimens was identical to Example 2. At a slow freezing rate (1° C./min), the formation of larger ice crystals was favored. This led to the noticeably increased pore size and alignment in the sintered electrode (see, e.g., FIGS. 10A-10B).

Figure 10C:
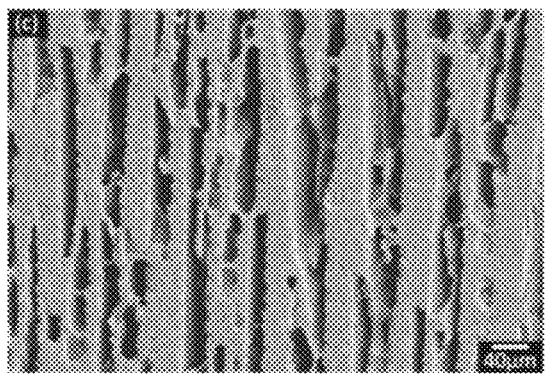
Figure 10D:
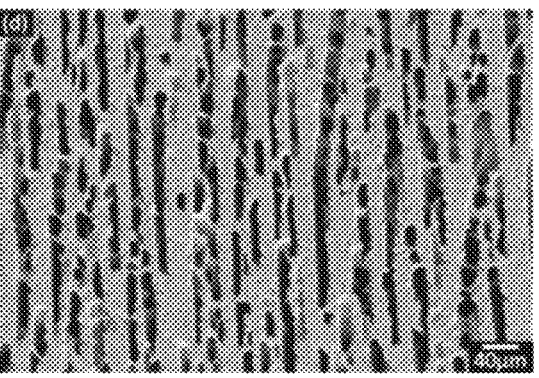

A further improvement to the structure was achieved by using additives. Rectangular-shaped pores were formed in the electrodes prepared with slurries with ethanol (FIG. 10C) and sucrose (FIG. 10D), in contrast to the irregular-shaped pores in the electrode without any additives.

Figure 11A:
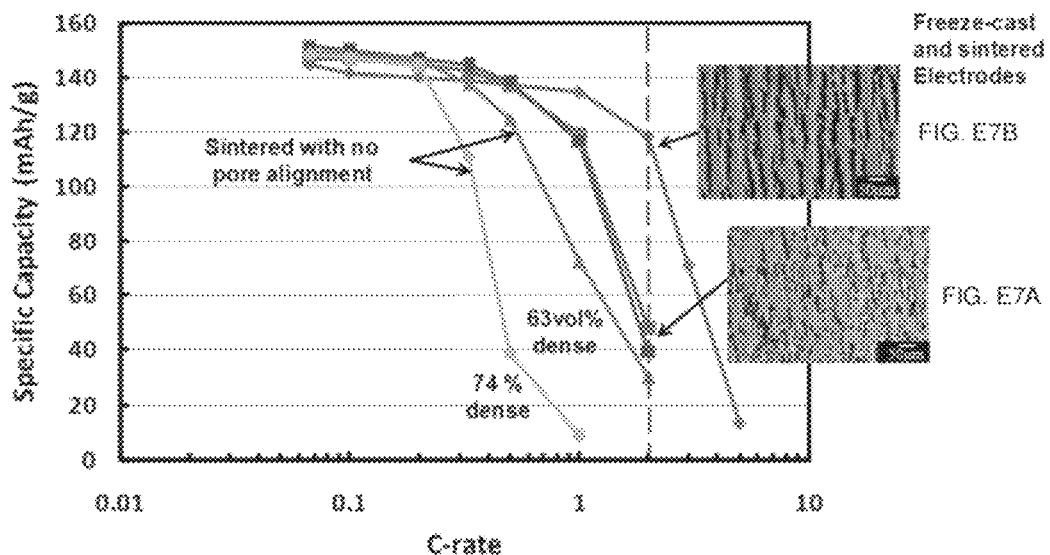
FIGS. 11A-11B are, according to one set of embodiments, (A) a plot of specific capacity as a function of C-rate and (B) a plot of voltage as a function of specific capacity, as measured during electrochemical testing of freeze-cast and sintered electrodes, compared to sintered electrodes without low-tortuosity porosity.
Figure 11B:
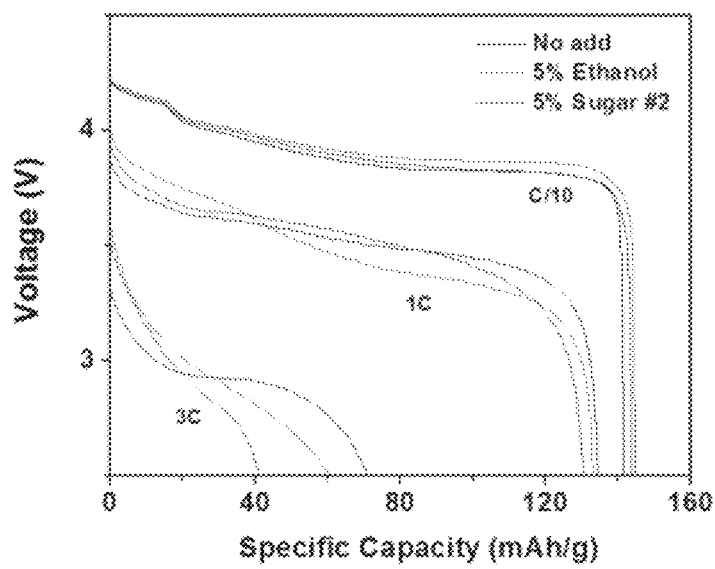

Electrochemical testing of the freeze-cast and sintered electrodes was conducted using the procedure described in Example 1. Results are shown in FIGS. 11A-11B. The dramatic improvement in storage capacity of the cathode in the low tortuosity structure (FIG. 10B) compared to others was clearly seen. For example, at a 2C discharge rate, the specific capacity was more than 3 times greater than that of sintered electrodes of similar density.

Example 4

Figure 12A:
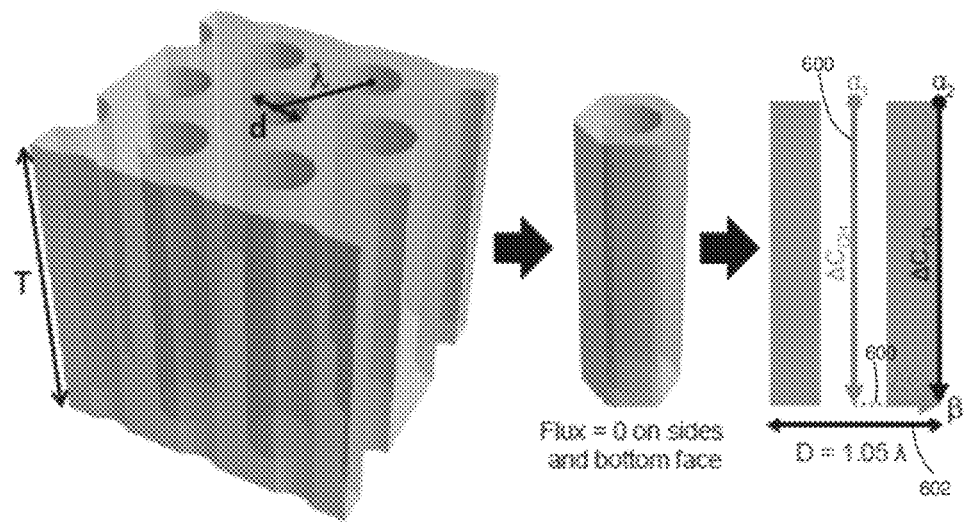
FIGS. 12A-12C are (A) a schematic diagram illustrating low-tortuosity pore distribution within an electrode, (B) an exemplary plot of the ratio of pore spacing to electrode thickness as a function of the ratio of low-tortuosity pore porosity to total porosity, and (C) an exemplary plot of the ratio of low-tortuosity pore porosity to total porosity as a function of the ratio of pore spacing to electrode thickness.

The benefits of adjusting various geometric parameters of the electrode were discovered by considering the hypothetical electrode system illustrated in FIG. 12A. In FIG. 12A, the low-tortuosity pore channels are arranged in a hexagonal array, and transport is considered inside the "unit cells," approximated as cylindrical tubes of porous material centered around each low-tortuosity pore channel. Electrode thickness, T, and overall electrode porosity, P, were fixed, thereby fixing the capacity and energy density of the electrode. The parameters which remained to define the design were the low-tortuosity pore channel spacing, $\lambda$, and $P_{CH}$, the porosity that can be attributed solely to the low-tortuosity pore channels. By definition, $P_{CH}$ must fall between zero (no low-tortuosity pore channels, homogenous electrode) and P (fully dense matrix, with all porosity allocated to low-tortuosity pore channels). The low-tortuosity pore channel diameter and the porosity of the matrix were uniquely determined by P, $\lambda$ and $P_{CH}$.

For this geometry, the effective tortuosity, $\tau_{eff}$, can be estimated as follows. Low-tortuosity pore channels can be assigned a tortuosity of 1. The tortuosity of the pores within the porous matrix can be assigned a tortuosity according to the modified Bruggeman relationship $\tau = \gamma \epsilon^{-1/2}$. A value of 1.5 was assumed for $\gamma$, as reported for partially sintered alumina over a range of $\epsilon$=0.15-0.5. Then, the porous electrode model of Doyle and Newman (M. Doyle, J. Newman, *J. Appl. Electrochem.* 1997, 27, 846) was used to obtain the concentration drop, $\Delta C$, or equivalently the current density, at steady state across the electrode from location $\alpha$ to $\beta$, for two limiting paths, under the same boundary conditions (i.e., a separator was assumed at the top of the electrode and a current collector at the bottom in FIG. 12A). One path (marked with arrows 600 in FIG. 12A) is along the low-tortuosity pore channel of unit tortuosity and then laterally across the matrix; the second path (marked with arrow 602) is through the porous matrix parallel to the low-tortuosity pore channels. For each path taken alone, an effective tortuosity could be obtained simply by comparing the concentration drop to that for the straight channel alone, of unit tortuosity. As the geometric parameters of the pore array are varied, either of these two limiting paths can dominate transport by providing the lower $\Delta C$. For example, transport through the matrix may dominate if the low-tortuosity pore channel cross-section is too fine or they are too sparsely distributed compared to the matrix. At another extreme, if all porosity is assigned to the low-tortuosity pore channels and the matrix porosity goes to zero, all transport will occur along the low-tortuosity pore channels. When both paths are effective, the net tortuosity can be obtained using the additivity rule for parallel resistors—this form interpolates smoothly between the limiting cases.

Figure 12B:
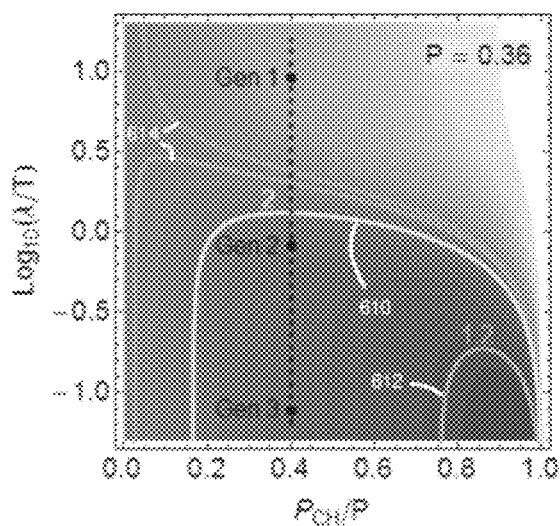
Figure 12C:
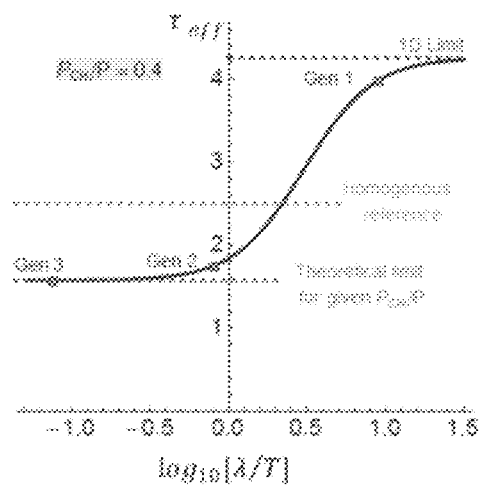

Results are shown in FIGS. 12B-12C for a material having P=0.36, corresponding to experimental samples discussed in Example 1. The low-tortuosity pore channel spacing relative to thickness, ($\lambda$/T), and the low-tortuosity pore channel fraction, ($P_{CH}$/P), emerged as logical independent variables. FIG. 12B shows iso-tortuosity contours for $\tau_{eff}$ as a function of ($P_{CH}$/P) and $\log_{10}(\lambda/T)$. Orange contours (614) mark the $\tau_{eff}$ values, within a chosen small range of ±4%, for a homogenous electrode in which $\tau_{eff}$=2.5 according to the assumed Bruggeman relation for P=0.36. (A range around the control value was chosen in order to display that at vanishing $P_{CH}$, effective tortuosity tends to the value for the homogenous sample over a very wide range of $\lambda$). Above these contours, the effective tortuosity was measurably higher than in the homogenous case. For example, to the upper right in the figure, nearly all available porosity appears as large widely-spaced low-tortuosity pore channel, with the consequence that transport in the dense matrix becomes rate-limiting. The yellow contour (610) denotes $\tau_{eff}$ that is 20% lower than the homogenous electrode value, which can be obtained, for example, by introducing a small volume fraction of low-tortuosity pore channels at a spacing equal to the electrode thickness ($\lambda$/T=1). Towards the lower right of FIG. 12B, one approaches an idealized structure of unit tortuosity, resulting when all porosity appears as straight low-tortuosity pore channels and the low-tortuosity pore channels have vanishingly small spacings (i.e., $V_{CH} \rightarrow V_P$, and $\lambda \rightarrow 0$). Such a structure is probably impractical to fabricate at large scale; aside from cost and time limitations, any heat treatment allowing mass transport may result in "pinch-off" of the narrow low-tortuosity pore channels due to the Rayleigh instability. However, what is encouraging in FIG. 12B is that tortuosities close to unity can be achieved for relative channel spacings $\lambda$/T in the range 0.1-1, constituting feasible objectives for scaleable processing. The green contour (612) marks designs for which $\tau_{eff}$=1.2, within 20% of the theoretically achievable minimum. For example, in a structure in which 80% of the porosity appears in the low-tortuosity pore channels, i.e. ($P_{CH}$/P)= 0.8, $\tau_{eff}$=1.2 is obtained at $\lambda$/T~1/6.

For comparison with experiments in which ($P_{CH}$/P)~0.4, the section of FIG. 12B represented by the vertical dashed line has been plotted as $\tau_{eff}$ against $\lambda$/T in FIG. 12C. The limiting behavior of $\tau_{eff}$ for large and small low-tortuosity pore channel spacings are indicated, as well as the reference value for a homogenous ("low-tortuosity pore channel-free") electrode of same overall porosity (P=0.36). The upper limit corresponds to the instance where the channels are too widely spaced to be effective and diffusion through the matrix parallel to the channels predominates; tortuosity is higher than the homogenous value because 40% of the available porosity appears in the low-tortuosity pore channels. The lower limit corresponds to the case where transport through the low-tortuosity pore channels predominates; here the tortuosity is improved but does not reach unity because 60% of the porosity remains in the matrix. The asymptotic approach to the limiting tortuosity at the lower left of FIG. 12C shows that reduction of low-tortuosity pore channel spacing below $\lambda$/T~0.1 has diminishing returns.

In summary, theoretical consideration of ion transport in the geometry described above revealed that measurable reduction of effective electrode tortuosity under discharge is possible when certain requirements on channel spacing, diameter and allocation of porosity are met. Structures of dual-scale porosity can achieve roughly a twofold enhancement in discharge rates over homogenous samples of the same overall density.

It should be noted that the forgoing description should be only considered to be illustrative and not restrictive. While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrode, comprising:
   a matrix material comprising high-tortuosity pores having tortuosities of at least 2; and
   a plurality of low-tortuosity pores having tortuosities of less than 1.5 extending through the matrix material and from a first external geometric surface of the electrode to a second external geometric surface of the electrode, wherein:
   the electrode has a total porosity of from 20% to 60%, and
   the percentage of the total porosity that is occupied by the low-tortuosity pores is from 20% to 80%.

2. The electrode of claim 1, wherein the electrode has a total porosity of from 29% to 39%, and the percentage of the total porosity that is occupied by the low-tortuosity pores is from 25% to 47%.

3. The electrode of claim 1, wherein the low-tortuosity pores are substantially straight.

4. The electrode of claim 1, wherein the first external geometric surface of the electrode is opposed to the second external geometric surface of the electrode.

5. The electrode of claim 1, wherein the ratio of the thickness of the electrode to the mean pore spacing of the low-tortuosity pores within the electrode is at least 0.2.

6. The electrode of claim 1, wherein the matrix material comprises an electrode active material.

7. The electrode of claim 6, wherein the ratio of the thickness of the electrode to the mean pore spacing of the low-tortuosity pores within the electrode is at least 0.2.

8. The electrode of claim 1, wherein the ratio of the average cross-sectional diameter of the low-tortuosity pores to the mean pore spacing of the low-tortuosity pores is from 0.05 to 1.0.

9. The electrode of claim 1, wherein the electrode has a total porosity of from 29% to 39%.

10. The electrode of claim 1, wherein the percentage of the total porosity that is occupied by the low-tortuosity pores is from 25% to 47%.

11. The electrode of claim 1, wherein the matrix material comprises a ceramic.

12. The electrode of claim 1, wherein the plurality of low-tortuosity pores have tortuosities of less than 1.2.

13. The electrode of claim 1, wherein the plurality of low-tortuosity pores have tortuosities of less than 1.1.

14. The electrode of claim 1, wherein the high-tortuosity pores have tortuosities of at least 3.

15. The electrode of claim 1, wherein the high-tortuosity pores have tortuosities of at least 4.

16. The electrode of claim 1, wherein the high-tortuosity pores have tortuosities of at least 5.

17. The electrode of claim 1, wherein the high-tortuosity pores have tortuosities of at least 2 and up to 20.

18. The electrode of claim 1, wherein the high-tortuosity pores have tortuosities of at least 3 and up to 20.

19. The electrode of claim 1, wherein the high-tortuosity pores have tortuosities of at least 4 and up to 20.

20. The electrode of claim 1, wherein the high-tortuosity pores have tortuosities of at least 5 and up to 20.

* * * * *